US008686676B2

(12) United States Patent
Yang et al.

(10) Patent No.: US 8,686,676 B2
(45) Date of Patent: Apr. 1, 2014

(54) TRASH CAN WITH POWER OPERATED LID

(75) Inventors: Frank Yang, Rancho Palos Verdes, CA (US); Joseph Sandor, Santa Ana Heights, CA (US); Orlando Cardenas, Laguna Niguel, CA (US)

(73) Assignee: simplehuman, LLC, Torrance, CA (US)

( * ) Notice: Subject to any disclaimer, the term of this patent is extended or adjusted under 35 U.S.C. 154(b) by 389 days.

(21) Appl. No.: 13/040,786

(22) Filed: Mar. 4, 2011

(65) Prior Publication Data

US 2011/0220648 A1 Sep. 15, 2011

Related U.S. Application Data

(60) Provisional application No. 61/313,736, filed on Mar. 13, 2010.

(51) Int. Cl.

*G05B 5/00* (2006.01)
*G05D 3/00* (2006.01)
*H02H 7/08* (2006.01)

(52) U.S. Cl.

USPC ........... 318/466; 318/467; 318/468; 318/280; 318/281; 318/282; 318/283; 318/284; 318/285; 318/286; 220/211; 220/260; 220/261; 220/262; 220/263; 340/545.3

(58) Field of Classification Search

USPC .................. 318/466–468, 280–286; 220/211, 220/260–263; 340/545.3

See application file for complete search history.

(56) References Cited

U.S. PATENT DOCUMENTS

| | | | |
|---|---|---|---|
| 1,426,211 | A | 8/1922 | Pausin |
| 1,461,253 | A | 7/1923 | Owen |
| 1,754,802 | A | 4/1930 | Raster |
| 1,820,555 | A | 8/1931 | Buschman |
| 1,891,651 | A | 12/1932 | Padelford et al. |
| 1,922,729 | A | 8/1933 | Giebel |
| 1,980,938 | A | 11/1934 | Geibel |
| D148,825 | S | 2/1948 | Snider |
| 2,457,274 | A | 12/1948 | Rifken |
| 2,759,625 | A | 8/1956 | Ritter |
| 2,888,307 | A | 5/1959 | Graves et al. |
| 2,946,474 | A | 7/1960 | Knapp |

(Continued)

FOREIGN PATENT DOCUMENTS

| | | |
|---|---|---|
| AU | 622536 | 4/1992 |
| CA | 2519295 | 3/2007 |

(Continued)

OTHER PUBLICATIONS

U.S. Appl. No. 13/417,084, filed Mar. 9, 2012.

(Continued)

*Primary Examiner* — Erick Glass

(74) *Attorney, Agent, or Firm* — Knobbe Martens Olson & Bear LLP

(57) ABSTRACT

A trash can with a power operated lid can include a sensor assembly and a lifting mechanism. The sensor assembly can include at least one light emitter and at least one light receiver, the viewing area of the at least one light receiver being limited in size. The lifting mechanism can include a controller, a drive motor, and a lifting member. The trash can with power operated lid can further include at least one position sensor for detecting the position of the lid.

48 Claims, 29 Drawing Sheets

(56) References Cited

U.S. PATENT DOCUMENTS 3,008,604 A 11/1961 Garner
3,023,922 A 3/1962 Arrington et al.
3,137,408 A 6/1964 Taylor
3,654,534 A 4/1972 Fischer
3,820,200 A 6/1974 Myers
3,825,150 A 7/1974 Taylor
3,825,215 A 7/1974 Borglum
3,886,425 A 5/1975 Weiss
3,891,115 A 6/1975 Ono
4,014,457 A 3/1977 Hodge
4,027,774 A 6/1977 Cote
4,081,105 A 3/1978 Dagonnet et al.
4,189,808 A 2/1980 Brown
4,200,197 A 4/1980 Meyer et al.
4,217,616 A 8/1980 Jessup
4,303,174 A 12/1981 Anderson
4,320,851 A 3/1982 Montoya
4,357,740 A 11/1982 Brown
4,416,197 A 11/1983 Kehl
4,457,483 A 7/1984 Gagne
4,535,911 A 8/1985 Goulter
4,570,304 A 2/1986 Montreuil et al.
4,576,310 A 3/1986 Isgar et al.
D284,320 S 6/1986 Kubic et al.
4,609,117 A 9/1986 Pamment
4,630,332 A 12/1986 Bisbing
4,630,752 A 12/1986 DeMars
4,664,347 A 5/1987 Brown et al.
4,697,312 A 10/1987 Freyer
4,711,161 A 12/1987 Swin et al.
4,729,490 A 3/1988 Ziegenbein
4,753,367 A 6/1988 Miller et al.
4,763,808 A 8/1988 Guhl et al.
4,765,548 A 8/1988 Sing
4,765,579 A 8/1988 Robbins et al.
4,792,039 A 12/1988 Dayton
4,794,973 A 1/1989 Perisic
4,834,260 A 5/1989 Auten
4,863,053 A 9/1989 Oberg
4,867,339 A 9/1989 Hahn
4,884,717 A 12/1989 Bussard et al.
4,892,224 A 1/1990 Graham
4,913,308 A 4/1990 Culbertson
4,918,568 A 4/1990 Stone et al.
4,923,087 A 5/1990 Burrows
4,948,004 A 8/1990 Chich
4,964,523 A 10/1990 Bieltvedt et al.
4,972,966 A 11/1990 Craft, Jr.
4,996,467 A 2/1991 Day
5,031,793 A 7/1991 Chen et al.
5,048,903 A 9/1991 Loblein
5,054,724 A 10/1991 Hutcheson
5,065,272 A 11/1991 Owen et al.
5,065,891 A 11/1991 Casey
5,090,785 A 2/1992 Stamp
5,100,087 A 3/1992 Ashby
5,111,958 A 5/1992 Witthoeft
D327,760 S 7/1992 Donnelly
D329,929 S 9/1992 Knoedler et al.
5,147,055 A 9/1992 Samson et al.
5,156,290 A 10/1992 Rodrigues
5,170,904 A 12/1992 Neuhaus
5,174,462 A 12/1992 Hames
D335,562 S 5/1993 Evans
5,213,272 A 5/1993 Gallagher et al.
5,222,704 A 6/1993 Light
5,226,558 A 7/1993 Whitney et al.
5,230,525 A 7/1993 Delmerico et al.
5,242,074 A 9/1993 Conaway et al.
D340,333 S 10/1993 Duran et al.
5,249,693 A 10/1993 Gillispie et al.
5,261,553 A 11/1993 Mueller et al.
5,314,151 A 5/1994 Carter-Mann
5,322,179 A 6/1994 Ting
5,329,212 A 7/1994 Feigleson
5,348,222 A 9/1994 Patey
5,381,588 A 1/1995 Nelson
5,385,258 A 1/1995 Sutherlin
5,390,818 A 2/1995 LaBuda
5,404,621 A 4/1995 Heinke
5,407,089 A 4/1995 Bird et al.
5,419,452 A 5/1995 Mueller et al.
5,471,708 A 12/1995 Lynch
5,474,201 A 12/1995 Liu
5,501,358 A 3/1996 Hobday
5,520,067 A 5/1996 Gabas
5,520,303 A 5/1996 Bernstein et al.
5,531,348 A 7/1996 Baker et al.
5,535,913 A 7/1996 Asbach et al.
5,558,254 A 9/1996 Anderson et al.
D377,554 S 1/1997 Adriaansen
5,611,507 A 3/1997 Smith
5,628,424 A 5/1997 Gola
5,632,401 A 5/1997 Hurd
5,636,416 A 6/1997 Anderson
5,644,111 A 7/1997 Cerny et al.
5,645,186 A 7/1997 Powers et al.
5,650,680 A 7/1997 Chula
D383,277 S 9/1997 Peters
5,662,235 A 9/1997 Nieto
5,690,247 A 11/1997 Boover
5,695,088 A 12/1997 Kasbohm
5,699,929 A 12/1997 Ouno
D388,922 S 1/1998 Peters
D389,631 S 1/1998 Peters
5,704,511 A 1/1998 Kellams
5,724,837 A 3/1998 Shin
5,730,312 A 3/1998 Hung
5,732,845 A 3/1998 Armaly, Jr.
5,735,495 A 4/1998 Kubota
5,738,239 A 4/1998 Triglia
5,799,909 A 9/1998 Ziegler
5,816,431 A 10/1998 Giannopoulos
5,816,640 A 10/1998 Nishimura
D401,719 S 11/1998 Van Leeuwen et al.
5,873,643 A 2/1999 Burgess, Jr. et al.
5,881,896 A 3/1999 Presnell et al.
5,881,901 A 3/1999 Hampton
5,884,237 A 3/1999 Kanki et al.
5,887,748 A 3/1999 Nguyen
5,967,392 A 10/1999 Niemi et al.
5,987,708 A 11/1999 Newton
6,000,569 A 12/1999 Liu
6,010,024 A 1/2000 Wang
6,024,238 A 2/2000 Jaros
6,036,050 A 3/2000 Ruane
6,102,239 A 8/2000 Wien
6,123,215 A 9/2000 Windle
D431,700 S 10/2000 Roudebush
6,126,031 A 10/2000 Reason
6,129,233 A 10/2000 Schiller
D435,951 S 1/2001 Yang et al.
6,209,744 B1 4/2001 Gill
6,211,637 B1 * 4/2001 Studer ........................... 318/466
6,234,339 B1 5/2001 Thomasd
6,250,492 B1 6/2001 Verbeek
D445,980 S 7/2001 Tjugum
6,286,706 B1 9/2001 Tucker
6,328,320 B1 12/2001 Walski et al.
6,345,725 B1 2/2002 Lin
6,364,147 B1 4/2002 Meinzinger et al.
6,386,386 B1 5/2002 George
6,390,321 B1 5/2002 Wang
6,401,958 B1 * 6/2002 Foss et al. ..................... 220/320
6,519,130 B1 2/2003 Breslow
6,557,716 B1 5/2003 Chan
6,596,983 B2 7/2003 Brent
6,626,316 B2 9/2003 Yang
6,626,317 B2 9/2003 Pfiefer et al.
D482,169 S 11/2003 Lin
6,659,407 B2 12/2003 Asaro
6,681,950 B2 1/2004 Miller, Jr. et al.
D488,604 S 4/2004 Yang et al.
D488,903 S 4/2004 Yang et al.

(56) References Cited

U.S. PATENT DOCUMENTS

D489,503 S 5/2004 Lin
D489,857 S 5/2004 Yang et al.
D490,583 S 5/2004 Yang et al.
D490,954 S 6/2004 Brand
D491,706 S 6/2004 Yang et al.
6,758,366 B2 7/2004 Bourgund et al.
D493,930 S 8/2004 Wang
D494,723 S 8/2004 Lin
6,812,655 B1 11/2004 Wang et al.
6,814,249 B2 11/2004 Lin
6,837,393 B1 1/2005 Kuo
6,857,538 B2 2/2005 Lin
6,859,005 B2 * 2/2005 Boliver ........................ 318/480
D503,021 S 3/2005 Yang et al.
6,866,826 B2 3/2005 Moore et al.
6,883,676 B2 4/2005 Lin
D507,090 S 7/2005 Yang et al.
6,920,994 B2 7/2005 Lin
6,974,948 B1 12/2005 Brent
D513,445 S 1/2006 Lin
6,981,606 B2 1/2006 Yang et al.
D517,764 S 3/2006 Wang
D517,767 S 3/2006 Yang et al.
D518,266 S 3/2006 Yang et al.
7,017,773 B2 3/2006 Gruber et al.
7,044,323 B2 5/2006 Yang
D525,756 S 7/2006 Yang et al.
7,073,677 B2 7/2006 Richardson et al.
7,077,283 B2 7/2006 Yang et al.
7,080,750 B2 7/2006 Wein et al.
7,086,550 B2 8/2006 Yang et al.
D528,726 S 9/2006 Lin
7,121,421 B2 10/2006 Yang et al.
D535,799 S 1/2007 Epps
D535,800 S 1/2007 Yang et al.
D537,223 S 2/2007 Lin
D537,599 S 2/2007 Lin
D537,601 S 2/2007 Lin
D537,999 S 3/2007 Lin
D538,995 S 3/2007 Lin
D539,498 S 3/2007 Yang et al.
D539,499 S 3/2007 Yang et al.
D540,001 S 4/2007 Zimmerman
D542,001 S 5/2007 Yang et al
D542,995 S 5/2007 Lin
D544,170 S 6/2007 Lin
D544,171 S 6/2007 Lin
D544,671 S 6/2007 Saunders et al.
D545,024 S 6/2007 Liao
7,225,943 B2 6/2007 Yang et al.
D547,020 S 7/2007 Chen
7,243,811 B1 7/2007 Ramsey
D550,918 S 9/2007 Wang et al.
D552,321 S 10/2007 Yang et al.
D552,823 S 10/2007 Yang et al.
D552,824 S 10/2007 Zimmerman
D552,825 S 10/2007 Yang et al.
D559,494 S 1/2008 Yang et al.
D559,495 S 1/2008 Yang et al.
7,328,842 B2 2/2008 Wagner et al.
D564,169 S 3/2008 Wang
D566,367 S 4/2008 Lin
D566,369 S 4/2008 Shek
D566,923 S 4/2008 Lin
7,374,060 B2 5/2008 Yang et al.
D571,520 S 6/2008 Lin
7,404,499 B1 7/2008 Ramsey
D576,371 S 9/2008 Zimmerman
D578,266 S 10/2008 Yang et al.
D578,722 S 10/2008 Yang et al.
7,438,199 B1 10/2008 Tidrick
D580,120 S 11/2008 Lin
D580,613 S 11/2008 Yang et al.
D580,615 S 11/2008 Yang et al.
D585,618 S 1/2009 Yang et al.
7,494,021 B2 2/2009 Yang et al.
7,540,396 B2 6/2009 Yang et al.
7,543,716 B2 6/2009 Lin
7,559,433 B2 7/2009 Yang et al.
D603,119 S 10/2009 Yang et al.
7,607,552 B2 10/2009 Efstathiou
7,621,420 B2 11/2009 Bandoh et al.
7,656,109 B2 2/2010 Yang et al.
D611,216 S 3/2010 Yang et al.
D611,671 S 3/2010 Yang et al.
7,694,838 B2 4/2010 Yang et al.
7,703,622 B1 4/2010 Bynoe
D615,722 S 5/2010 Yang et al.
7,712,285 B2 * 5/2010 Stravitz et al. .................... 53/77
7,741,801 B2 * 6/2010 Fukuizumi .................... 318/480
7,748,556 B2 7/2010 Yang et al.
7,781,995 B2 8/2010 Yang et al.
7,806,285 B2 10/2010 Yang et al.
D631,221 S 1/2011 Yang et al.
D632,864 S 2/2011 Yang et al.
D634,911 S 3/2011 Yang et al.
7,896,187 B2 3/2011 Haibel
7,922,024 B2 4/2011 Yang et al.
7,950,543 B2 5/2011 Yang et al.
D644,390 S 8/2011 Smeets et al.
7,992,742 B1 8/2011 Kim
8,006,857 B2 8/2011 Lin
8,074,833 B2 12/2011 Yang et al.
8,136,688 B2 3/2012 Lee et al.
D657,108 S 4/2012 Yang et al.
D657,109 S 4/2012 Liao
D672,520 S 12/2012 Yang et al.
D675,802 S 2/2013 Yang et al.
D675,803 S 2/2013 Yang et al.
8,418,869 B2 4/2013 Yang et al.
2001/0002690 A1 6/2001 Rosky
2001/0020619 A1 9/2001 Pfeifer et al.
2002/0079315 A1 6/2002 Yang
2002/0092853 A1 7/2002 Wang
2002/0096524 A1 7/2002 Hardesty
2002/0104266 A1 8/2002 Ranaudo
2003/0089719 A1 5/2003 Berger
2003/0201265 A1 10/2003 Lin
2003/0201267 A1 10/2003 Yang et al.
2003/0230576 A1 12/2003 Lin
2004/0004080 A1 1/2004 Yang et al.
2004/0016756 A1 1/2004 Lin
2004/0020927 A1 2/2004 Yang et al.
2004/0134924 A1 7/2004 Hansen et al.
2004/0140782 A1 7/2004 Okabe et al.
2004/0164077 A1 8/2004 Kuo
2004/0174268 A1 9/2004 Scott et al.
2004/0175303 A1 9/2004 Lin
2004/0199401 A1 10/2004 Wagner
2004/0200938 A1 10/2004 Forlivio
2004/0206758 A1 10/2004 Lin
2004/0206760 A1 10/2004 Gagnebin
2004/0251746 A1 12/2004 Ichimaru et al.
2005/0017006 A1 1/2005 Kuo
2005/0017010 A1 1/2005 Siegel et al.
2005/0103788 A1 5/2005 Yang et al.
2005/0133506 A1 6/2005 Yang et al.
2005/0230396 A1 10/2005 Yang et al.
2005/0230397 A1 10/2005 Yang et al.
2005/0258794 A1 11/2005 Fukuizumi
2005/0284870 A1 12/2005 Yang et al.
2006/0027579 A1 2/2006 Yang et al.
2006/0056741 A1 3/2006 Yang et al.
2006/0103086 A1 5/2006 Niemeyer et al.
2006/0175336 A1 8/2006 Wang
2006/0186121 A1 8/2006 Yang et al.
2006/0196874 A1 9/2006 Yang
2006/0213910 A1 9/2006 Yang et al.
2006/0226149 A1 10/2006 Yang et al.
2006/0249510 A1 11/2006 Lin
2006/0255033 A1 11/2006 Yang et al.
2006/0261071 A1 11/2006 Yang et al.
2006/0278643 A1 12/2006 Chiou
2007/0012699 A1 1/2007 Yang

(56) References Cited

U.S. PATENT DOCUMENTS

| | | | |
|---|---|---|---|
| 2007/0034334 A1 | 2/2007 | Ramsey et al. | |
| 2007/0090112 A1 | 4/2007 | Kalman et al. | |
| 2007/0114847 A1 | 5/2007 | Ichimaru et al. | |
| 2007/0181579 A1 | 8/2007 | Kuo et al. | |
| 2007/0182551 A1 | 8/2007 | Yang et al. | |
| 2007/0205195 A1 | 9/2007 | Yang et al. | |
| 2007/0241109 A1 | 10/2007 | Lin | |
| 2007/0266637 A1 | 11/2007 | McGowan | |
| 2007/0272691 A1 | 11/2007 | Wang et al. | |
| 2007/0289972 A1 | 12/2007 | Wynn et al. | |
| 2008/0011754 A1 | 1/2008 | Ramsey | |
| 2008/0011910 A1 | 1/2008 | Ramsey | |
| 2008/0083756 A1 | 4/2008 | Daniels | |
| 2008/0164257 A1 | 7/2008 | Boll et al. | |
| 2008/0236275 A1 | 10/2008 | Breed et al. | |
| 2008/0237234 A1 | 10/2008 | Yang et al. | |
| 2008/0257889 A1 | 10/2008 | Kovacevich et al. | |
| 2008/0257890 A1 | 10/2008 | Kovacevich et al. | |
| 2008/0257891 A1 | 10/2008 | Kovacevich et al. | |
| 2008/0264948 A1 | 10/2008 | Kovacevich et al. | |
| 2008/0264950 A1 | 10/2008 | Kovacevich et al. | |
| 2008/0272119 A1 | 11/2008 | Efstathiou | |
| 2008/0272127 A1 | 11/2008 | Kovacevich et al. | |
| 2009/0084788 A1 | 4/2009 | Yang et al. | |
| 2009/0194532 A1* | 8/2009 | Yang et al. | 220/211 |
| 2009/0230131 A1 | 9/2009 | McDuffie et al. | |
| 2009/0261105 A1 | 10/2009 | Cunningham et al. | |
| 2009/0266836 A1 | 10/2009 | Mobley | |
| 2010/0006572 A1 | 1/2010 | Chiou | |
| 2010/0170904 A1* | 7/2010 | Kalman et al. | 220/495.01 |
| 2010/0224627 A1 | 9/2010 | Yang et al. | |
| 2010/0237074 A1 | 9/2010 | Yang et al. | |
| 2011/0139781 A1 | 6/2011 | Jin et al. | |
| 2011/0220646 A1 | 9/2011 | Yang et al. | |
| 2011/0220647 A1 | 9/2011 | Yang et al. | |
| 2011/0220655 A1 | 9/2011 | Yang et al. | |
| 2013/0193145 A1 | 8/2013 | Yang et al. | |
| 2013/0233853 A1 | 9/2013 | Yang et al. | |
| 2013/0233857 A1 | 9/2013 | Yang et al. | |

FOREIGN PATENT DOCUMENTS

| | | |
|---|---|---|
| CA | 132181 | 6/2010 |
| CA | 136938 | 5/2011 |
| CA | 141819 | 4/2012 |
| CA | 146601 | 2/2013 |
| CN | 301947175 S | 6/2012 |
| DE | 1610087 | 6/1950 |
| DE | 1283741 | 7/1966 |
| DE | 8436939 | 3/1985 |
| DE | 9108341 | 10/1991 |
| DE | 4225936 A1 | 2/1994 |
| DE | 19525885 | 3/1997 |
| DE | 19809331 | 5/1999 |
| DE | 29918687 | 3/2000 |
| DE | 19933180 | 1/2001 |
| DE | 10148997 | 4/2003 |
| DE | 20217561 | 3/2004 |
| EP | 0582240 | 7/1993 |
| EP | 0903305 A1 | 3/1999 |
| EP | 0906876 | 4/1999 |
| EP | 1094017 | 4/2001 |
| EP | 1361176 | 11/2003 |
| EP | 1136393 | 4/2004 |
| EP | 1647503 A1 | 4/2006 |
| EP | 1686073 | 8/2006 |
| EP | 1686073 A1 | 8/2006 |
| EP | 1918223 A1 | 5/2008 |
| EP | 1700799 B1 | 8/2009 |
| EP | 001164826-0001 | 9/2009 |
| EP | 001232904-0001 | 10/2010 |
| EP | 001908575-0001 | 8/2011 |
| EP | 001317416-0001 | 4/2012 |
| EP | 001317416-0002 | 4/2012 |
| EP | 001335285-0001 | 7/2012 |
| EP | 001335293-0001 | 7/2012 |
| FR | 2887152 | 12/2006 |
| GB | 191004921 | 0/1910 |
| GB | 2384418 | 7/2003 |
| JP | 02 152670 | 6/1990 |
| JP | 06-272888 | 9/1994 |
| JP | D1300450 | 5/2007 |
| JP | D1300451 | 5/2007 |
| JP | D1322056 | 2/2008 |
| KR | 3003841370000 | 6/2005 |
| KR | 3004095430000 | 3/2006 |
| KR | 3004095430001 | 7/2006 |
| NL | 6908550 | 12/1970 |
| TW | D112733 | 9/2006 |
| TW | D129485 | 7/2009 |
| TW | D133382 | 2/2010 |
| TW | D133678 | 3/2010 |
| TW | D147147 | 5/2012 |
| WO | WO 92/02430 | 2/1992 |
| WO | WO 2006-079263 | 8/2006 |
| WO | WO 2007/139570 | 12/2007 |
| WO | WO 2009/114495 | 9/2009 |

OTHER PUBLICATIONS

U.S. Appl. No. 29/411,482, filed Jan. 20, 2012.
U.S. Appl. No. 29/411,490, filed Jan. 20, 2012.
U.S. Appl. No. 29/411,491, filed Jan. 20, 2012.
European Search Report for Application No. EP 10002273, dated Jan. 4, 2011, in 9 pages.
European Search Report for European Application No. EP 06010394, dated Aug. 24, 2006, in 1 page.
Partial European Search Report for Application No. EP 10002273, dated Jul. 2, 2010, in 4 pages.
Search Report for Taiwan Design Patent Application No. 097304453, dated Apr. 22, 2009.
Search Report for Taiwan Design Patent Application No. 099304439, dated Jul. 1, 2011, in 1 page.
Trento Corner 23 Trash Can, Hailo product brochure, http://www.hailo.de/html/default.asp?site=12_71_107&lang=en.
U.S. Appl. No. 13/783,149, filed Mar. 1, 2013, Yang et al.
U.S. Appl. No. 29/447,313, filed Mar. 1, 2013, Yang et al.
Extended Search Report for European Patent Application No. 11157823.3, dated Mar. 28, 2013, in 5 pages.

* cited by examiner

| |
|---|
| FIG. 28-1 |
| FIG. 28-2 |

TRASH CAN WITH POWER OPERATED LID

CROSS REFERENCE TO RELATED APPLICATION

This application claims benefit under 35 U.S.C. §119(e) to U.S. Provisional Patent Application No. 61/313,736, filed Mar. 13, 2010, which is incorporated in its entirety by reference herein.

BACKGROUND OF THE INVENTION

1. Field of the Invention

The present inventions relate to power operated devices, such as power operated lids or doors for receptacles.

2. Description of the Related Art

Receptacles and other devices having a lid or a door are used in a variety of different settings. For example, in both residential and commercial settings, trash cans and other devices often have lids for protecting or preventing the escape of the contents of the receptacle. In the context of trash cans, some trash cans include lids or doors to prevent odors from escaping and to hide the trash within the receptacle from view. Additionally, the lid of a trash can helps prevent contamination from escaping from the receptacle.

Recently, trash cans with power operated lids have become commercially available. Such trash cans can include a sensor positioned on or near the lid. Such a sensor can be configured to detect movement, such as a user's hand being waived near the sensor, as a signal for opening the lid. When such a sensor is activated, a motor within the trash receptacle opens the lid or door and thus allows a user to place items into the receptacle. Afterwards, the lid can be automatically closed.

However, such motion sensors present some difficulties. For example, users of current trash cans with power operated lids can experience problems if the trash within the receptacle or can is piled higher than the level of the lid itself. If the trash or other material within the can is higher than the level of the lid itself, the lid will be unable to completely close. This can cause the motor or batteries to wear down, continue running, and/or ultimately fail. It can also force the user to reset the controller, remove trash, or manually compress the trash until the lid can be closed.

Additionally, typical motion sensors are configured to detect changes in reflected light. Thus, a user's clothing and skin color can cause the device to operate differently. More particularly, such sensors are better able to detect movement of a user's hand having one clothing and skin color combination, but less sensitive to the movement of another user's hand having a different clothing and/or skin color combination. Additionally, sensors can be sensitive to lights being turned on and off in a room, or moved across or in front of the trash can.

If such a sensor is calibrated to detect the movement of any user's hand or body part within, for example, twelve inches of the sensor, the sensor may also be triggered accidentally. If the sensor is triggered accidentally too often, the batteries powering such a device can be worn out too quickly, energy can be wasted, and/or the motor can be over used. However, if the sensors are calibrated to be less sensitive, it can be difficult for some users, depending on their clothing and/or skin color combination, to activate the sensor conveniently.

Problems also exist if the battery or other power source accumulates a charge or charges on its ends. These charges may give a false indication of the actual voltage differential across the battery, and can cause the motor and/or lid to move or act differently or run at different speeds during different uses.

Additionally, problems exist if users wish to empty multiple sets or handfuls of trash. Once the sensor has been activated, the lid can rise to an open position, and then can automatically close. However, once the lid begins to close, the user is forced to wait until the lid has reached a fully closed position before it can be opened again. If the user suddenly wants to open the lid again, or has another collection of trash to throw away while the lid is closing, he or she must wait until the lid has returned to its fully closed position before activating the sensor again.

SUMMARY OF THE INVENTION

An aspect of at least one of the inventions disclosed herein includes the realization that light detectors, such as infrared detectors used for triggering the opening or closing of a trash can lid, such as those disclosed U.S. Patent Publication No. 2009/0194532, can be triggered by ambient sunlight as well as certain kinds of indoor lighting. For example, it has been found that pulsations from florescent tube lighting can trigger known infrared detectors even if the infrared detectors are designed to detect a frequency of pulsations that is different than the frequency of pulsations florescent lights are designed to emit. More specifically, it has been found as florescent tube lights age, the frequency of pulsations of their emitted light gradually falls through a range of frequencies. Additionally, when multiple florescent tube lights are positioned in the same room, overlapping streams of different frequencies of pulsations can create many different effective pulsations. It has been found that two bit encryption of such infrared detectors still results in occasional false triggering of such detectors when in the presence of two or more florescent tube lights.

It has further been found that using at least a three bit encryption technique can nearly eliminate false triggers. It has also been discovered that a four bit encryption technique can completely eliminate false triggers, regardless of the environment of use of a device is outdoors or under a high number of florescent lights pulsating at many different frequencies. It is, however, recognized that it may be possible that such florescent lights could trigger a system having four bit encryption. However, after some investigation, no such false triggering have been observed.

Another aspect of at least some of the embodiments disclosed herein includes the realization that limiting the effective viewing angles of the optical detectors can further enhance protection against false triggering. For example, light detectors used on trash cans can be configured to have viewing angles that are wider in a direction parallel to the front surface of the trash can and narrower in the direction perpendicular to the front surface of the trash can. Such an oblong shaped viewing pattern for the optical sensors provides better protection against unintended actuation when a user walks past the trash can and provides satisfactory detection of the movement of part of a user's body over the trash can along a direction perpendicular to the front surface of the trash can. Further enhancements can also be achieved by providing two or more optical receivers along a front surface of a trash can so as to effectively further widen the viewing of the optical sensing system of the trash can, while preserving the false triggering protection provided by the narrowed detection angle noted above.

Another aspect of at least some of the embodiments disclosed herein includes the realization that when a trash can lid is closing, the lid can often be accidentally activated by merely the movement of the lid itself, or by other extraneous sources of light or movement. Therefore, it would be advantageous to have a sensor trash can that has a high filter mode while the trash can lid is closing.

Another aspect of at least one of the embodiments disclosed herein includes the realization that when a trash can lid is fully opened, a user may often want to keep the trash can lid opened, or may want to have the option of quickly and easily reactivating the opening of the lid to keep it open. This is especially true when a user has a large amount of trash to deposit over a period of time, and is concerned that the lid will close. Thus, it would be advantageous to have an operating mode that allows the lid to remain open for an extended period of time, and/or to have an operating mode that permits quick and easy reactivation.

Another aspect of at least one of the embodiments disclosed herein includes the realization that it can be advantageous to have a lid that moves at a predetermined speed when it opens, and a predetermined speed when it closes, to give the trash can a more consistent feel and look. It can further be advantageous to have monitoring mode that can apply speed offsets to either increase or decrease the lid speed to bring it closer to the predetermined values.

Therefore, in accordance with at least one embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, a lifting member connected to the lid and configured to be moved by the motor and gear assembly, a plurality of position detectors located adjacent the lifting member for detecting a position of the lifting member, at least one light emitter located at an upper end of the receptacle and configured to transmit an encrypted, pulsed light signal, the encryption being at least a three-bit encryption, at least one light receiver located at an upper end of the receptacle configured to receive the encrypted, pulsed light signal, the at least one receiver having a limited, oblong receiving area for receiving the pulsed light signal, and a controller configured to control operation of the lid. The controller can comprise at least one lid movement trigger module configured to detect whether the receiver has received the encrypted, pulsed signal a predetermined number of times and to issue a command to the controller to open the lid, a lid position monitor module configured to monitor positions of the lifting member and determine whether the lid is in an open or closed state, at least one fault detection module configured to stop operation of the motor and to provide an indication of a fault if the motor has been operating for more than a predetermined time period, a high filter module configured to increase the number of times the encrypted, pulsed light signal is received prior to issuing a command to the controller to open the lid, a hold open module configured to hold the lid in an open position for a first amount of time if the encrypted, pulsed light signal is received for a second amount of time, a hypermode module configured to increase the sensitivity of the at least one receiver by increasing frequency and/or amperage of the encrypted, pulsed light signal, and a speed compensation module configured to adjust the speed of the movement of the lid based on predetermined optimal speeds.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, a lifting member connected to the lid and configured to be moved by the motor and gear assembly, and at least one light emitter located at an upper end of the receptacle configured to transmit an encrypted, pulsed light signal, the encryption being at least a three-bit encryption signal.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, a lifting member connected to the lid and configured to be moved by the motor and gear assembly, and at least one light receiver located at an upper end of the receptacle configured to receive the encrypted, pulsed light signal, the at least one light receiver having a limited, oblong receiving area for receiving the pulsed light signal.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, at least one light emitter located at an upper end of the receptacle configured to transmit an encrypted, pulsed light signal, at least one light receiver located at an upper end of the receptacle configured to receive the encrypted, pulsed light signal, and a controller configured to control operation of the lid. The controller can comprise at least one lid movement trigger module configured to detect whether the light receiver has received the encrypted, pulsed signal a predetermined number of times and to issue a command to the controller to open the lid, and a high filter module configured to increase the number of times the encrypted, pulsed light signal must be received prior to issuing a command to the controller to open the lid.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, at least one light emitter located at an upper end of the receptacle configured to transmit an encrypted, pulsed light signal, at least one light receiver located at an upper end of the receptacle configured to receive the encrypted, pulsed light signal, and a controller configured to control operation of the lid. The controller can comprise at least one lid movement trigger module configured to detect whether the light receiver has received the encrypted, pulsed signal a predetermined number of times and to issue a command to the controller to open the lid, and a hold open module configured to hold the lid in an open position for a first amount of time if the encrypted, pulsed light signal is received for a second amount of time.

In accordance with another embodiment, an enclosed receptacle can, comprise a receptacle portion defining a reservoir, a lid mounted relative to the receptacle and configured to move between opened and closed positions, a power supply, a motor and gear assembly configured to move the lid between the opened and closed positions, at least one light emitter located at an upper end of the receptacle configured to transmit an encrypted, pulsed light signal, at least one light receiver located at an upper end of the receptacle configured to receive the encrypted, pulsed light signal, and a controller configured to control operation of the lid. The controller can comprise at least one lid movement trigger module configured to detect whether the light receiver has received the encrypted, pulsed signal a predetermined number of times and to issue a command to the controller to open the lid, and an increased sensitivity module configured to increase the sensitivity of the at least one light receiver by increasing frequency and/or amperage of the encrypted, pulsed light signal.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, at least one light emitter located at an upper end of the receptacle configured to transmit an encrypted, pulsed light signal, at least one light receiver located at an upper end of the receptacle configured to receive the encrypted, pulsed light signal, and a controller configured to control operation of the lid. The controller can comprise at least one lid movement trigger module configured to detect whether the light receiver has received the encrypted, pulsed signal a predetermined number of times and to issue a command to the controller to open the lid, and a speed compensation module configured to adjust the speed of the movement of the lid based on predetermined optimal speeds.

In accordance with another embodiment, an enclosed receptacle can comprise a receptacle portion defining a reservoir, a lid mounted relative to the receptacle and configured to move between opened and closed positions, a power supply, and a motor and gear assembly configured to move the lid between the opened and closed positions, the motor and gear assembly comprising a lifting mechanism comprising a drive motor comprising a drive gear, a lifting member comprising a pivoting rack gear and a flagging member, the lifting member configured to be driven by the drive gear, and a plurality of position detectors configured to detect a position of the flagging member.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, a lifting member connected to the lid and configured to be moved by the motor and gear assembly, a sensor assembly comprising at least one light emitter, at least one light receiver, and a shell component configured to be placed over both the at least one light emitter and the at least one light receiver, the shell component having at least one opening formed into a V-shaped formation to be placed over the at least one light emitter so as to provide a light emitting region above the sensor assembly.

In accordance with another embodiment, an enclosed receptacle can comprise a receptacle portion defining a reservoir, a lid mounted relative to the receptacle and configured to move between opened and closed positions, a power supply, a motor and gear assembly configured to move the lid between the opened and closed positions, a lifting member connected to the lid and configured to be moved by the motor and gear assembly, a sensor assembly comprising a first plurality of light emitters in a central portion of the sensor assembly, and at least a second plurality of light emitters in an outer portion of the sensor assembly, and further comprising at least one light receiver in the central portion of the sensor assembly.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF THE PREFERRED EMBODIMENT

The embodiments of a powered system for opening and closing a lid or door of a receptacle or other device is disclosed in the context of a trash can. The inventions disclosed herein are described in the context of a trash can because they have particular utility in this context. However, the inventions disclosed herein can be used in other contexts as well, including, for example, but without limitation, large commercial trash cans, doors, windows, security gates, and other larger doors or lids, as well as doors or lids for smaller devices such as high precision scales, computer drives, etc.

Figure 1:
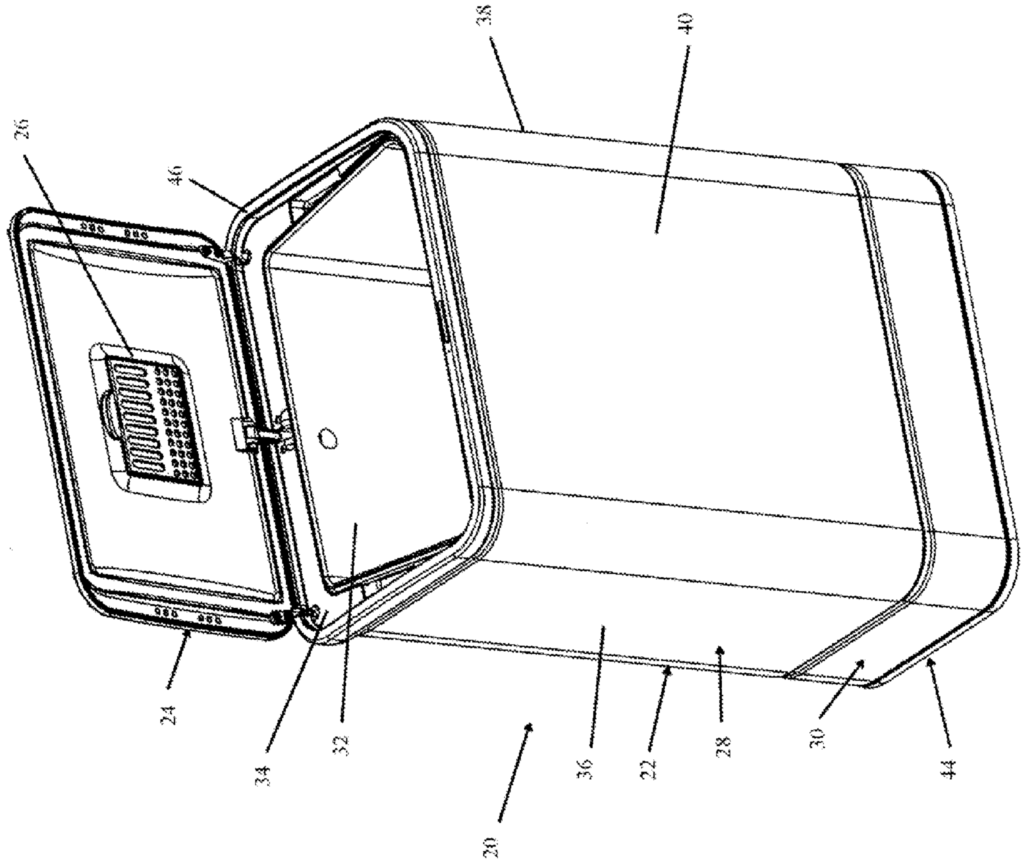
FIG. 1 is a top, front, and right side perspective view of an embodiment of an enclosed receptacle, with its lid opened.
Figure 2:
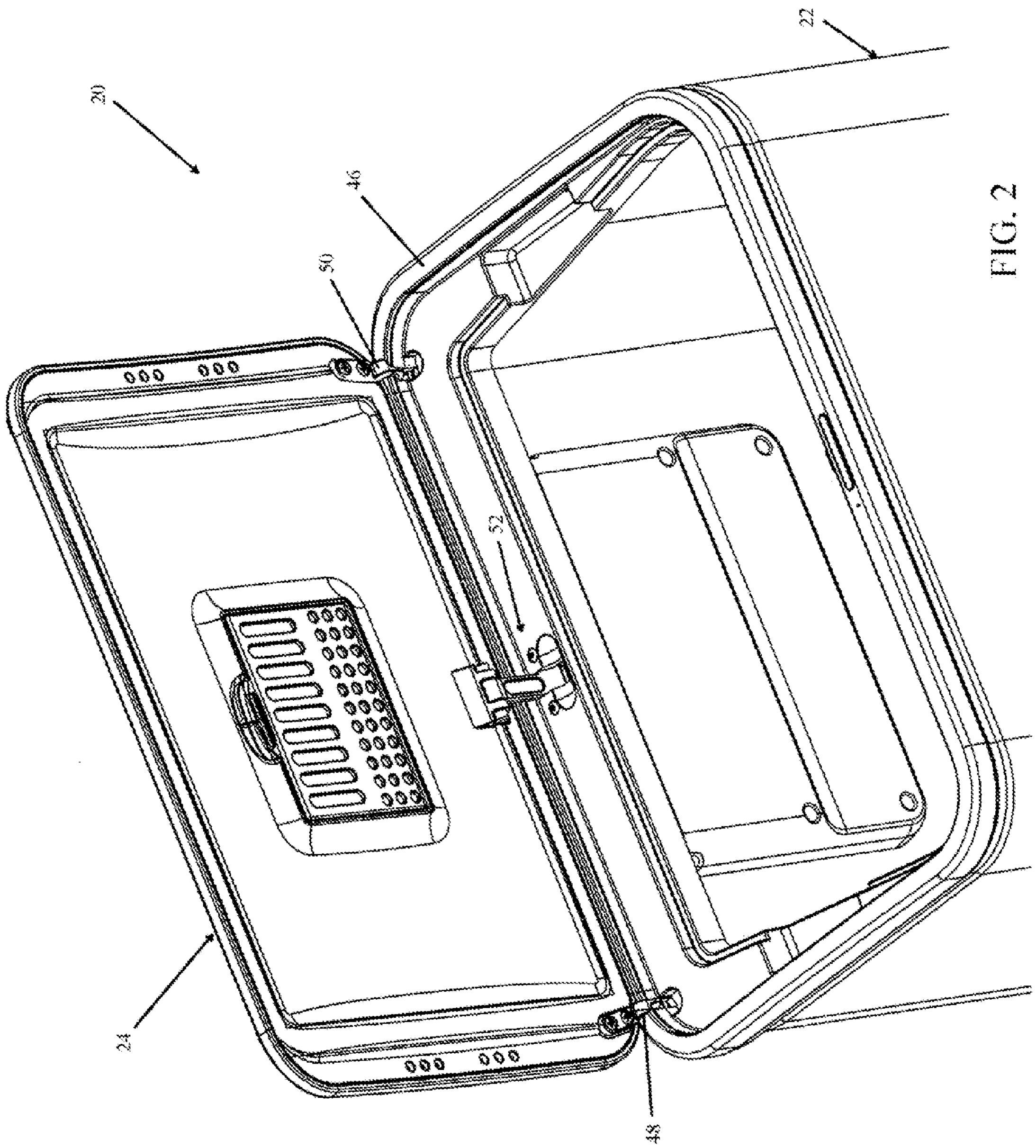
FIG. 2 is an enlarged top, front, and right side perspective view of the receptacle illustrated in FIG. 1.

With reference to FIGS. 1 and 2, a trash can assembly 20 can include an outer shell component 22 and lid 24. Lid 24 can include door components, such as for example door component 26 in the form of an air filter. The trash can assembly 20 can be configured to rest on a floor, and can be of varying heights and widths depending on, among other things, consumer need, cost, and ease of manufacture.

The trash can assembly 20 can include outer shell component 22, which can comprise upper shell portion 28, and lower shell portion 30. The trash can assembly can further comprise an inner liner 32 configured to be retained within the outer shell component 22. For example, an upper peripheral edge of the outer shell component 22 can be configured to support an upper peripheral edge of inner liner 32, such that the inner liner 32 is suspended by its upper peripheral edge within the outer shell component 22. Optionally, the trash can assembly 20 can include a liner support member 34 supported by the shell component 22 and configured to support the liner 32 within the interior of the outer shell component 22. In other embodiments, the inner liner 32 is seated on a lower portion of the outer shell component 22.

Figure 3:
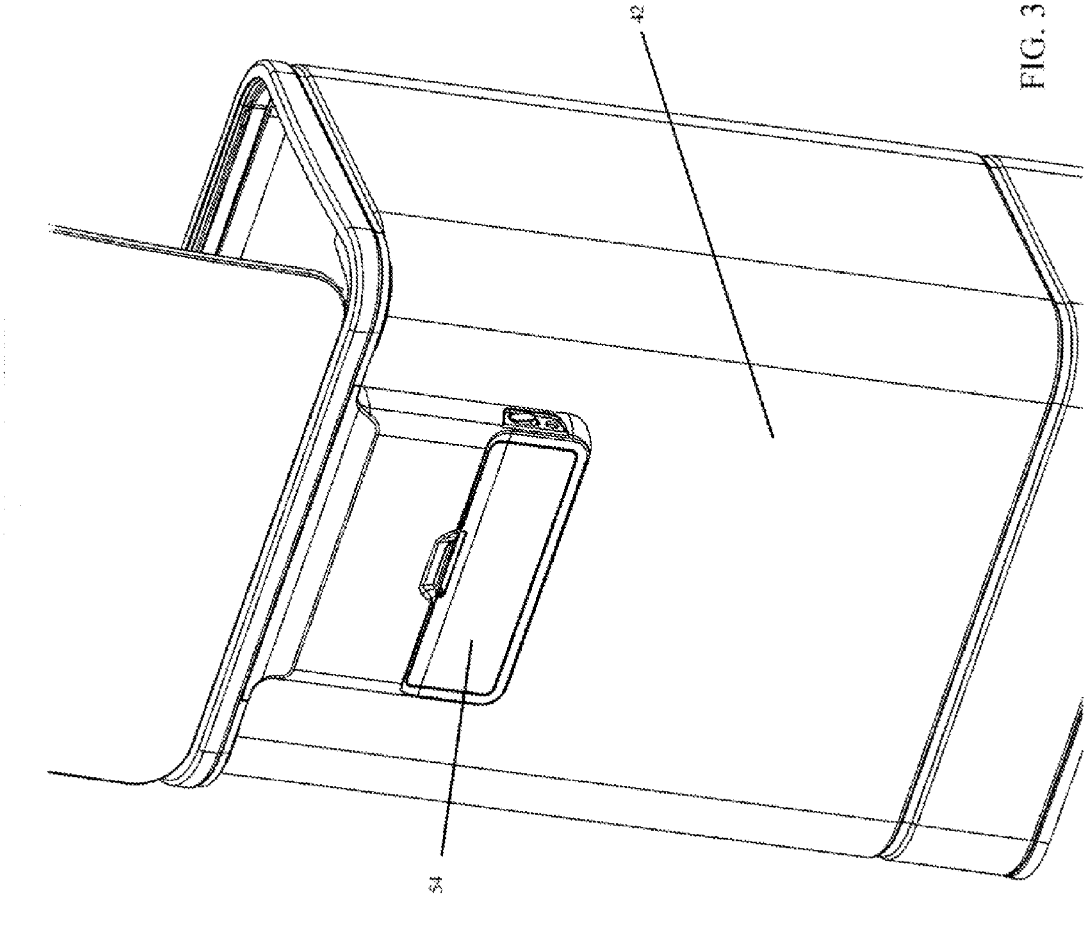
FIG. 3 is a top, rear, right side perspective view of the receptacle shown in FIG. 1.

The outer shell component 22 can assume any configuration. As shown in FIG. 1, the outer shell component 22 can have a generally rectangular cross sectional configuration with sidewalls 36, 38, a front wall 40 and a rear wall 42 (FIG. 3). The inner liner 32 can have a shape that generally compliments the shape defined by the outer shell component 22. However, other configurations can also be used. The upper and lower shell portions 28, 30 can be made from plastic, steel, stainless steel, aluminum or any other material.

The trash can assembly 20 can also include a base 44. The base 44 can include screws or other components for attachment to the outer shell component 22, and can have a flat lower portion for resting on a surface, such as a kitchen floor. The base 44 of the trash can assembly 20 can be made integrally, monolithically, or separate from the outer shell component 22. Thus, the base 44 can be made from any material including plastic, steel, stainless steel, aluminum or any other material. Additionally, in some embodiments, such as those in which the outer shell component 22 is stainless steel, the base 44 can be a plastic material.

The lid 24 can be pivotally attached to the trash can assembly by any known means. In the illustrated embodiment, the lid 24 is pivotally attached to an upper lid support ring 46 which can be securely mounted to the upper periphery of the outer shell component 22. Hinges 48 and 50 can be constructed in any known manner. The trash can assembly can also include a door lifting mechanism 52, which can be used to move the lid 24 about hinges 48 and 50.

Figure 4:
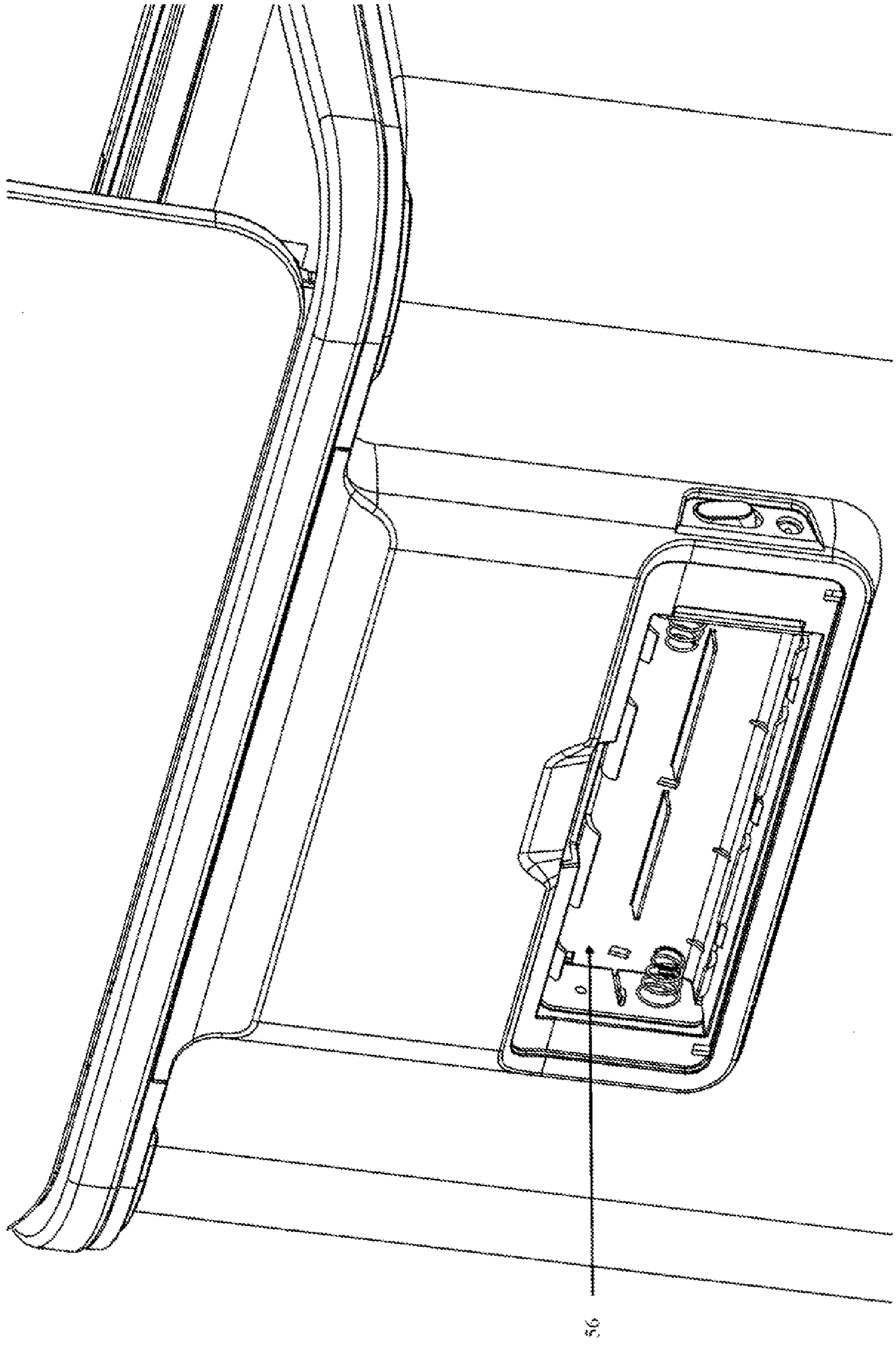
FIG. 4 is an enlarged top, rear, right side perspective view of the receptacle shown in FIG. 1, with a back cover removed.

With reference to FIGS. 3 and 4, and as described above, the trash can 20 can include the rear wall 42. Along the rear wall 42, the trash can 20 can include a back cover 54. The back cover 54 can enclose and/or protect a back side enclosure 56. The back side enclosure 56 can house the power source for the trash can 20. For example, in some embodiments, the back side enclosure 56 can be configured to receive and retain at least one battery.

Figure 5:
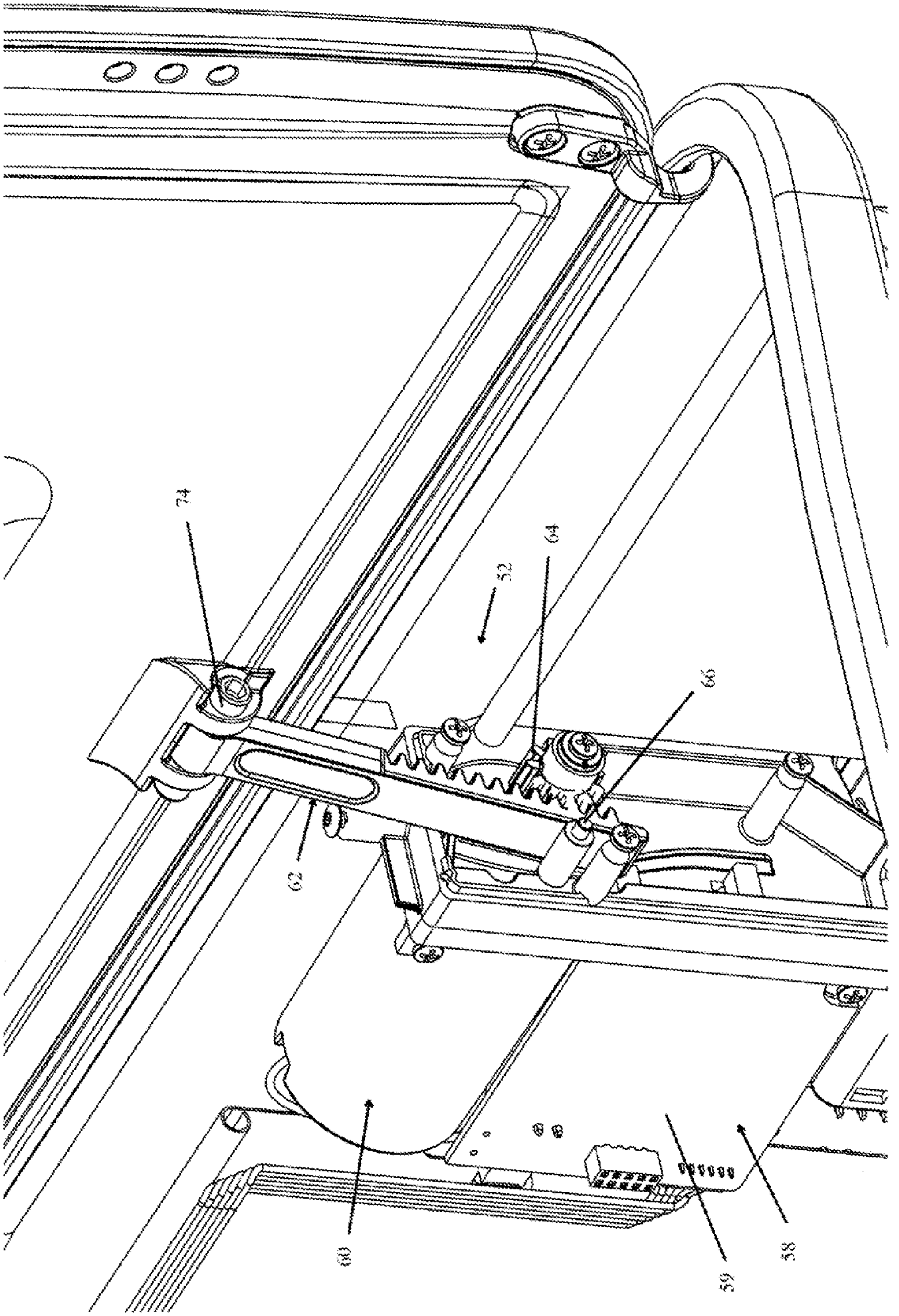
FIG. 5 is an enlarged top, front, and left side perspective view of the receptacle illustrated in Figure, with the lid in open position, partially exploded, and with the trash can liner and upper liner support removed.

With reference to FIG. 5, the lifting mechanism 52 can include a controller 58, a drive motor 60, and a lifting member 62 (e.g. an elongate rod that acts as a pivoting rack gear). At least a portion of the lifting mechanism 52 can be removable from the remainder of the enclosed receptacle. For example, the drive motor 60, or other component, can be removable such that it can be repaired, replaced, etc. The controller 58 can communicate with a sensing system (described below) to determine to when to drive the motor 60 so as to urge the lifting member 62 along the opening and closing direction.

As shown in FIG. 5, the drive motor 60 can include a drive gear 64 mounted to its output shaft. The drive gear 64 can have any tooth pitch configuration desired, depending on the loads, speed, etc. Additionally, the drive motor 60 can include a gear reduction. In some embodiments, the gear reduction can be 5 to 1, 10 to 1, 50 to 1, 100 to 1, or any other gear reduction which would provide the desired opening and closing speed characteristics. In some embodiments, the lid 24 can be manually pushed shut at any time during operation, such that the drive motor 60, lifting member 62, and/or drive gear 64 permits slippage. For example, the drive motor 60 can include a clutch, or other structure, that permits the lid 24 to be returned home to a closed position. In some embodiments, the clutch can be configured to slip easier forcing the lid 24 down towards a closed position than forcing the lid 24 up towards an open position.

Lifting mechanism 52 can include a guide roller 66 configured to guide the lifting member 62 along the opening and closing direction as it interacts with the drive gear 64, described in greater detail below with reference to FIGS. 8-11.

Figure 6:
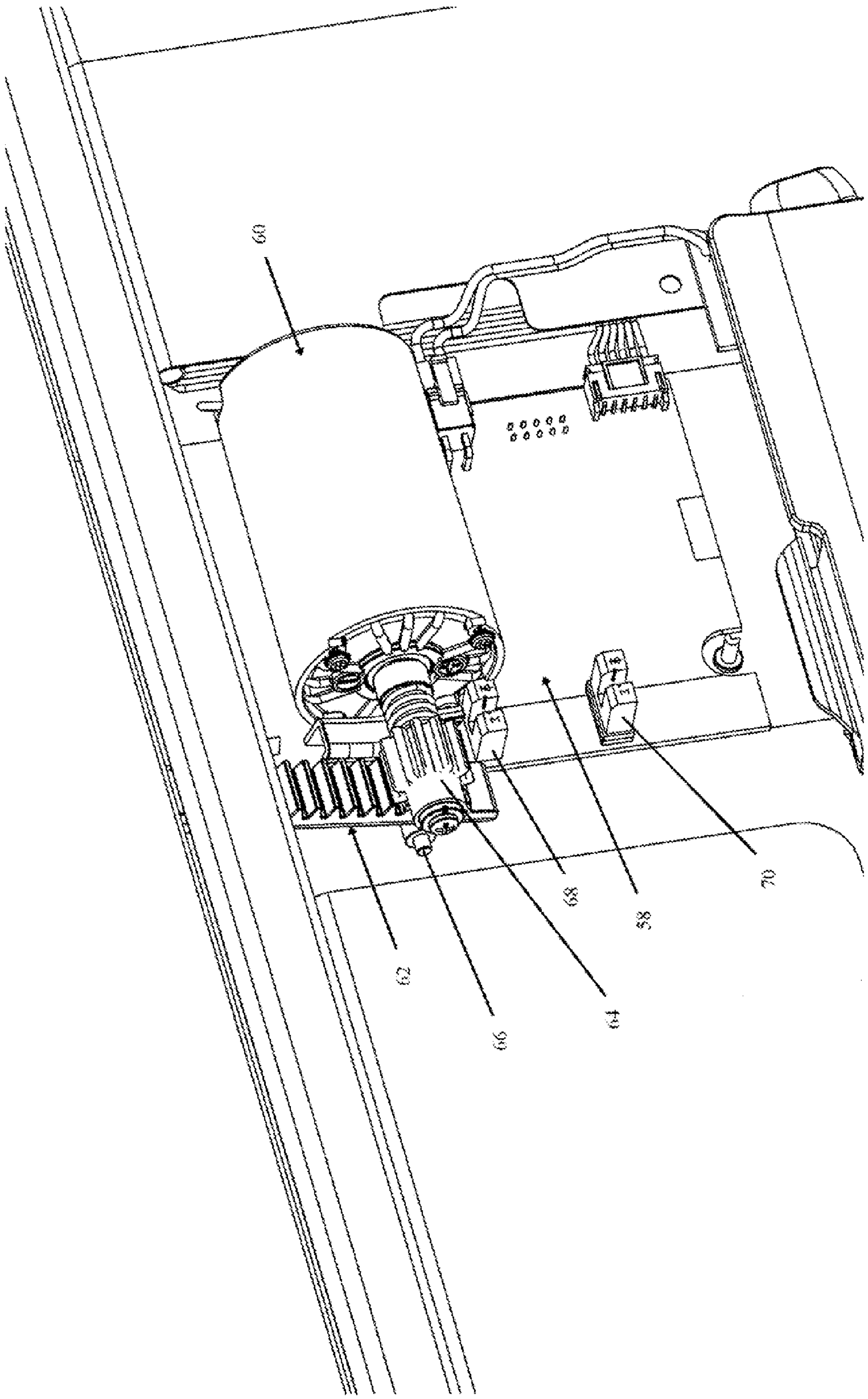
FIG. 6 is an enlarged top, rear, and left side perspective view of the lifting mechanism illustrated in FIG. 5.
Figure 7:
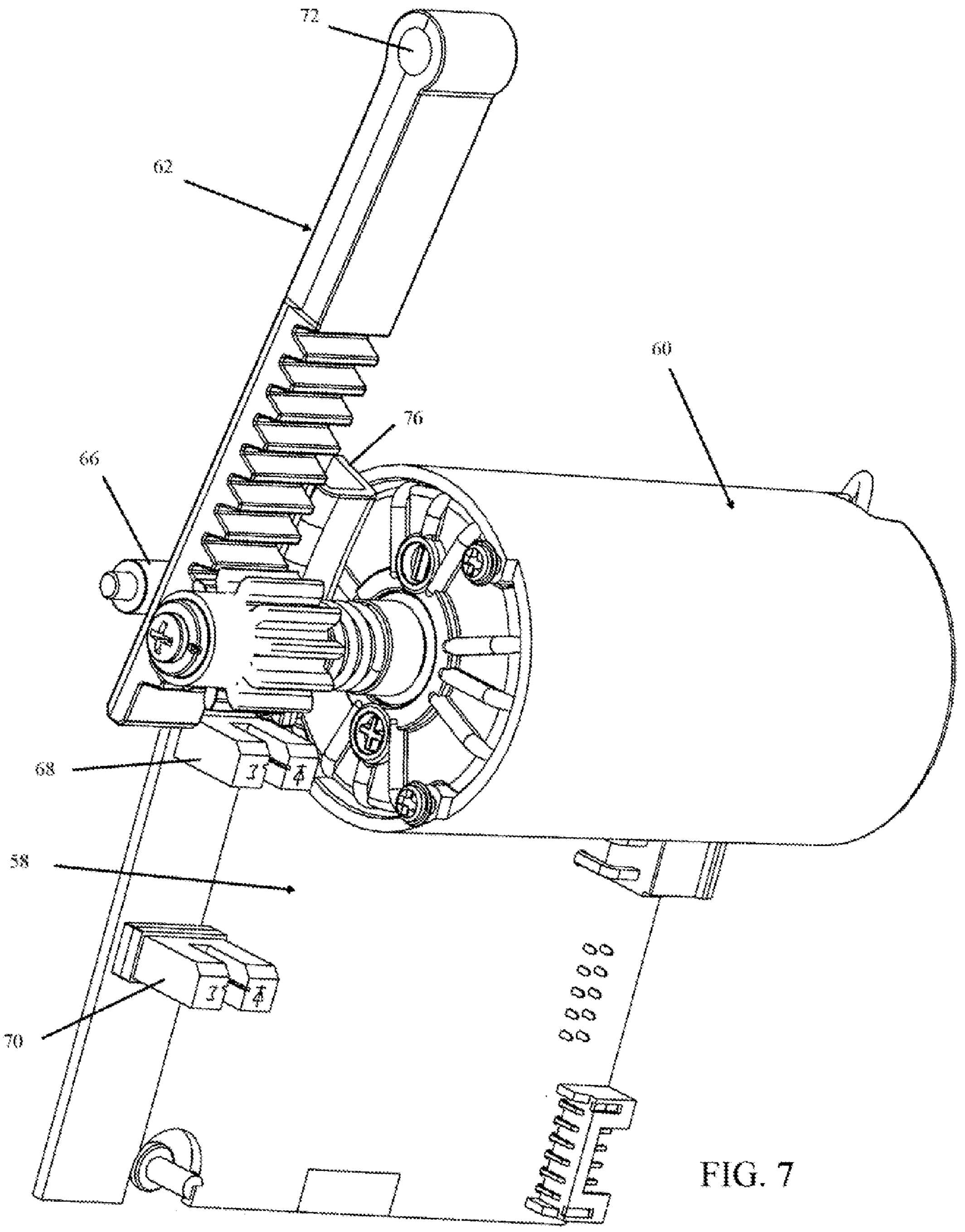
FIG. 7 is a further enlarged perspective view of the motor and gear drive mechanism of the lifting mechanism illustrated in FIG. 6.

With reference to FIGS. 6 and 7, the lifting mechanism 52 can also include one or more position detectors 68 (an upper position sensor), 70 (a lower position sensor). The position detectors 68, 70 can be in the form of paired optical proximity detectors, for example, a light emitter and a light receiver. However, other types of sensors can also be used.

The position detectors 68, 70 can be configured to detect the position of the lifting member 62 as it moves between the open and closed positions, also described in greater detail below with reference to FIGS. 8-11. The motor 60 and the position detectors 68, 70 can be connected to the controller 58 so as to cooperate in controlling the movement of the lifting member 62 and thus the lid 24.

Figure 8:
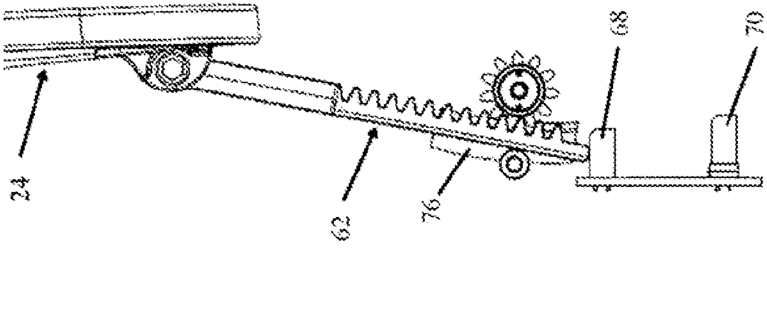
FIG. 8 is a schematic view of a portion of a lifting mechanism illustrating the arrangement of a drive gear and a rack gear of the lifting mechanism when the lid is in a fully open position.

As shown in FIG. 8, when the lid 24 is in the open position, the lifting member 62 is pulled to its fully extended position away from the position sensors 68, 70. The lifting member 62, at its upper end, can include a cylindrical passage 72 (FIG. 7) which can be connected to the lid 24 with a hinge pin assembly 74 (FIG. 5). The lifting member 62 can also include a flagging member 76 which can be used to provide a means for indicating a position of the lid 24, in cooperation with the position sensors 68, 70. In some embodiments, the enclosed receptacle 20 can comprise more than one lid 24. For example, the enclosed receptacle can comprise two lids 24 (e.g. side by side). In this type of embodiment, the lifting member 62 can comprise a fork-like shape at its upper end, such that each prong of the fork can contact one of two lids 24. The lifting member 62 can thus be configured to open both lids 24 simultaneously. Alternatively, the enclosed receptacle 20 can include more than one lifting member 62 and drive motor 60.

As shown in FIG. 8, when the lifting member 62 is in its fully extended position, corresponding to the lid 24 being in the fully open position, the flagging member 76 has traveled through and above, i.e. does not trigger, the upper position sensor 68 and the lower position sensor 70. Thus, the controller 58 can be configured to determine that the lid 24 has reached its uppermost position after the flagging member 76 has passed by both position sensors 70 and 68. More specifically, for example, the controller 58 can be configured to determine that the lid 24 has reached its uppermost open position just as the flagging member 76 passes and is above the upper position sensor 68 on its way towards the open position.

Figure 10:
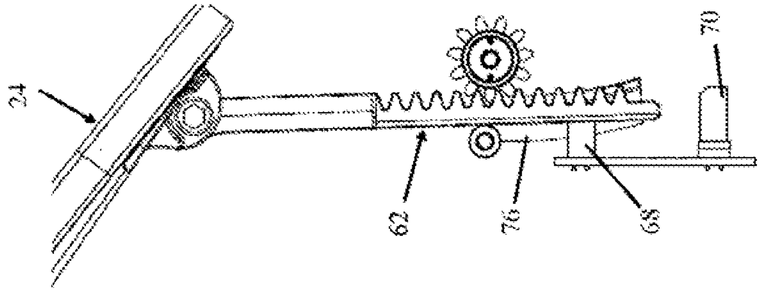
FIG. 10 is another schematic view of a portion of the lifting mechanism illustrated in FIG. 8 schematically showing an intermediate position of certain components when the lid is in an intermediate position between the open and closed positions.
Figure 9:
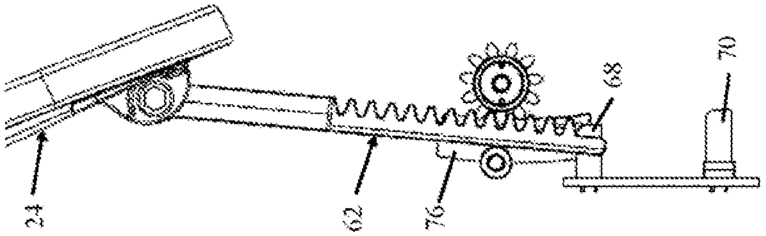
FIG. 9 is another schematic view of a portion of the lifting mechanism illustrated in FIG. 8 schematically showing an intermediate position of certain components when the lid is in an intermediate position between the open and closed positions.

As shown in FIGS. 9 and 10, when the lid 24 is in an intermediate position between the opened and closed position, the flagging member 76 can interact and thus trigger the upper position sensor 68.

Figure 11:
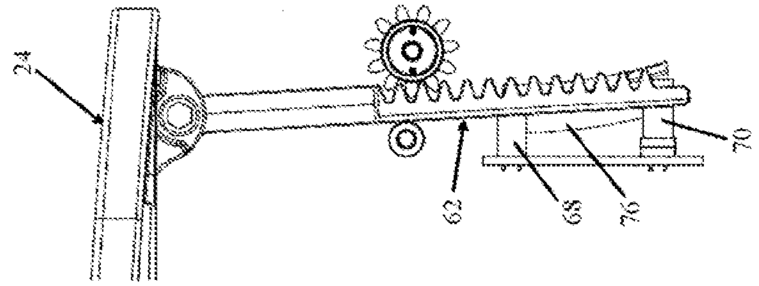
FIG. 11 is a further schematic illustration of the components illustrated in FIG. 8, when the lid is in a fully closed position.

As shown in FIG. 11, when the lid 24 is in its fully closed position, the lifting member 62 can be in its fully retracted position, and the flagging member 76 can trigger the position sensor 70 or can trigger both position sensors 68, 70. More specifically, for example, the controller 58 can be configured to determine that the lid 24 is in the closed position as the flagging member 76 passes the position sensor 70 and still triggers the sensor 68. However, any combination of flagging members and position sensors can be used to detect the position of the lid 24.

Figure 12:
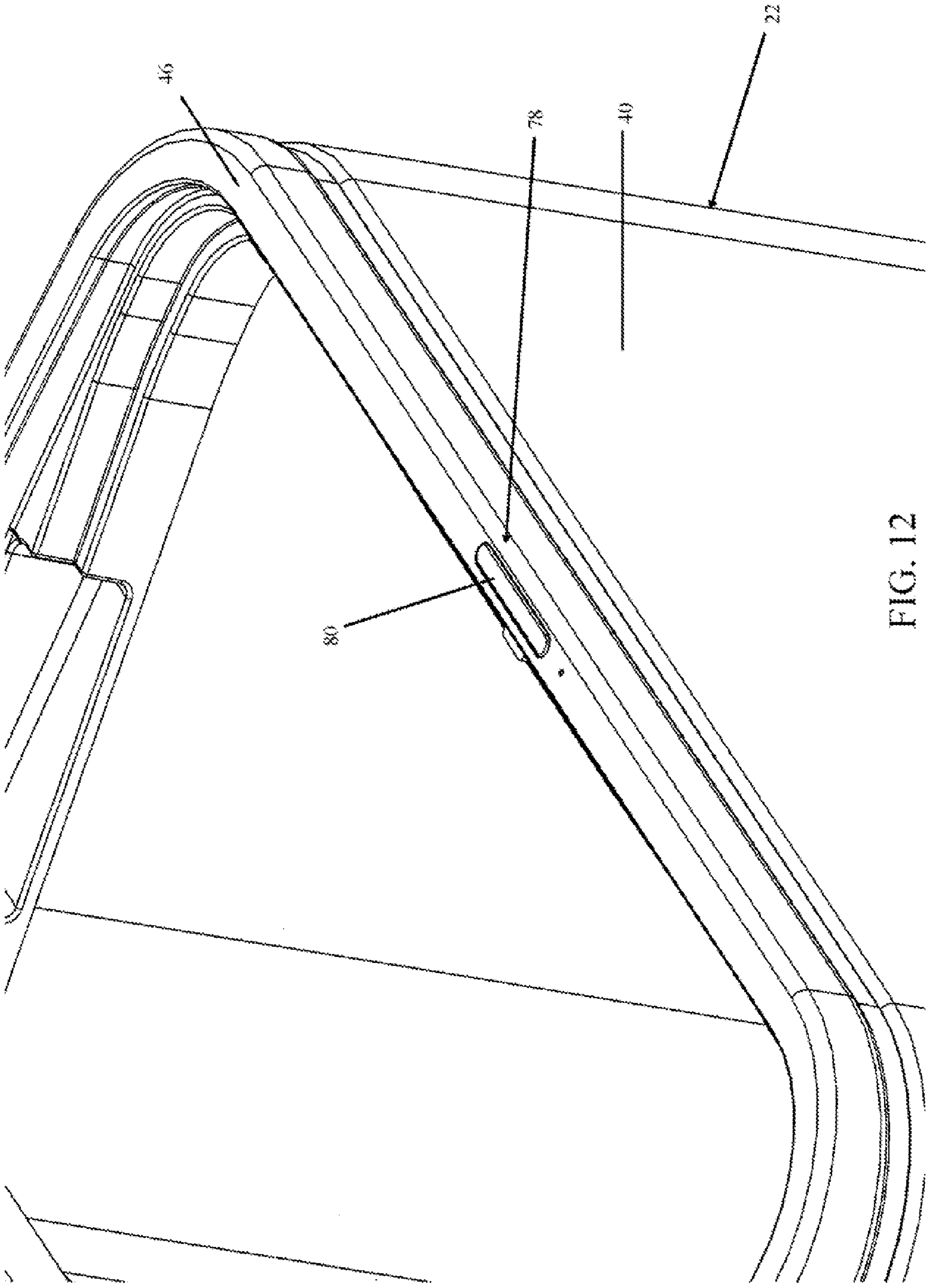
FIG. 12 is a top, front, and right side perspective view of a sensor assembly on a front portion of the trash can illustrated in FIG. 1.

With reference to FIG. 12, the trash can assembly 20 can also include a sensor assembly 78 disposed on an outer portion of the trash can assembly 20. In the illustrated embodiment, the sensor assembly 78 is disposed at an upper central portion of the outer shell portion 22, along the front wall 40. The sensor assembly 78 can include an outer covering 80 which can include a transparent or translucent structure that permits transmission and/or receipt of light signals. For example, the outer covering 80 can be made of plastics such as Polycarbonate, Makrolon®, etc. In some embodiments, the outer covering 80 can be substantially flush with the upper support ring 46. In some embodiments, the sensor assembly 78 is placed along the upper support ring 46 having a width of about from 0.5 cm to about 2 cm.

Figure 13:
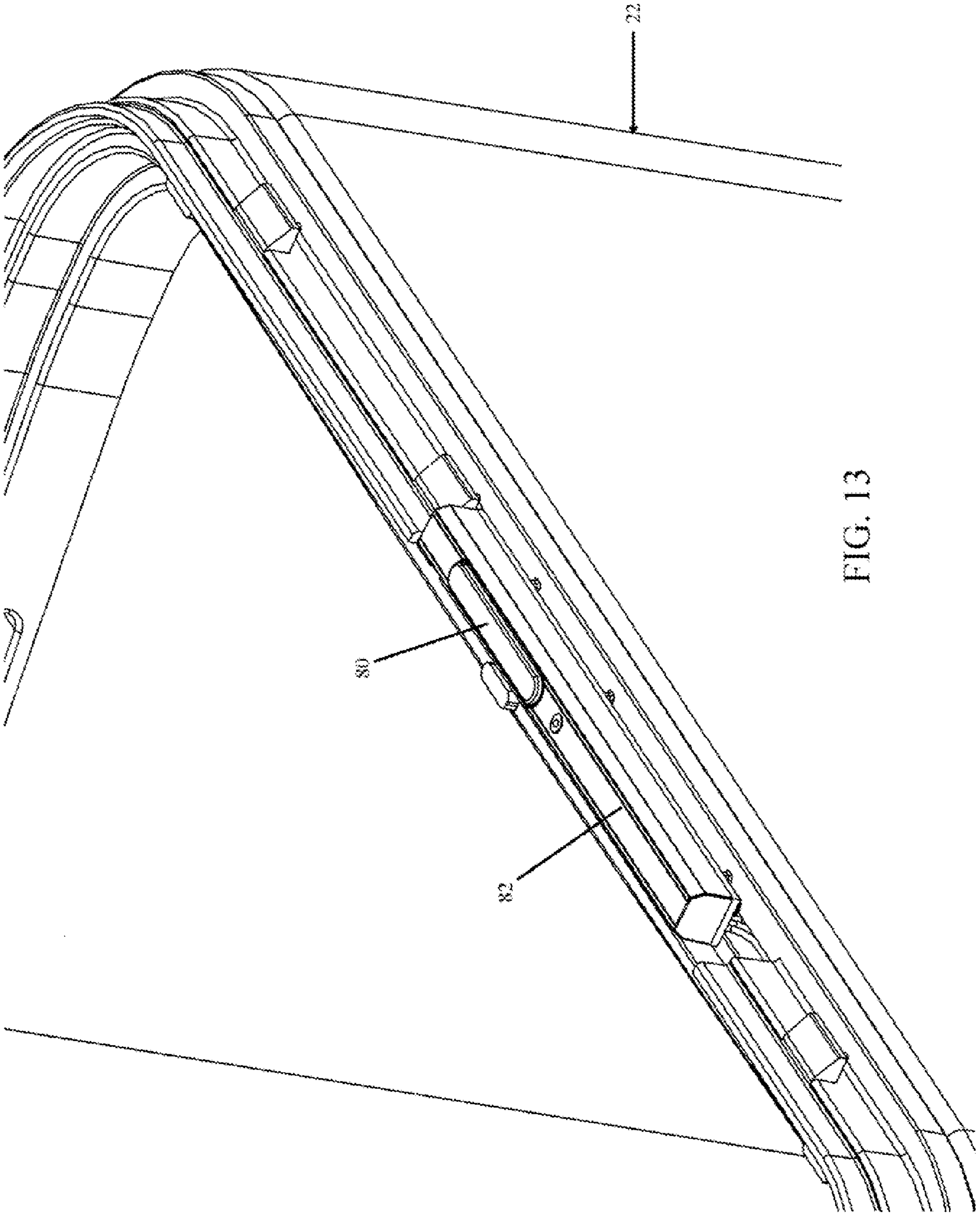
FIG. 13 is a top, front, and right side perspective view of the sensor assembly in FIG. 12, with a support ring removed.
Figure 14:
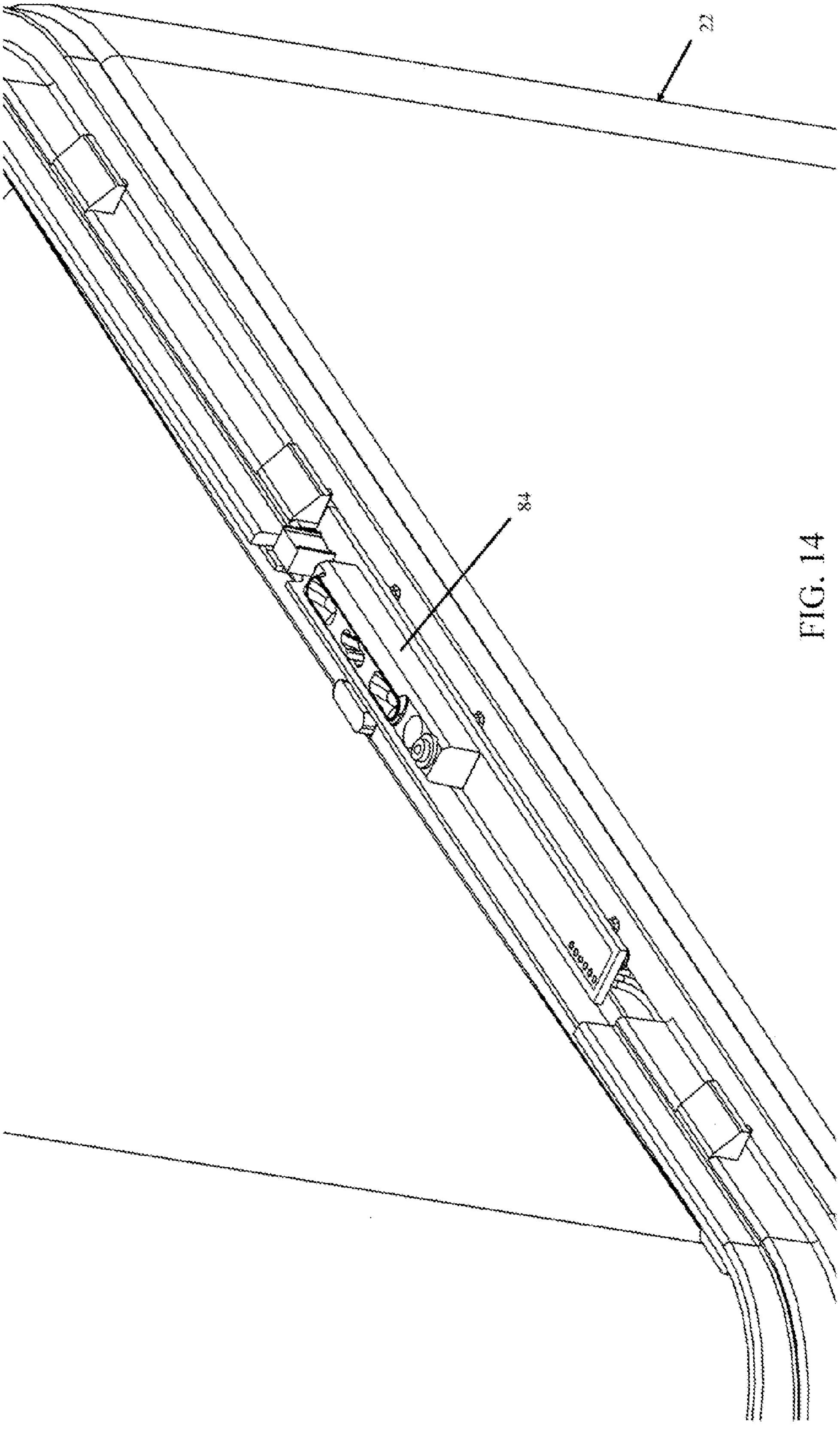
FIG. 14 is top, front, and right side perspective view of the sensor assembly in FIG. 13, with a further portion of the sensor assembly removed.

With reference to FIG. 13, the covering 80 can comprise part of a structure 82 that sits beneath the support ring 46.

Figure 15A:
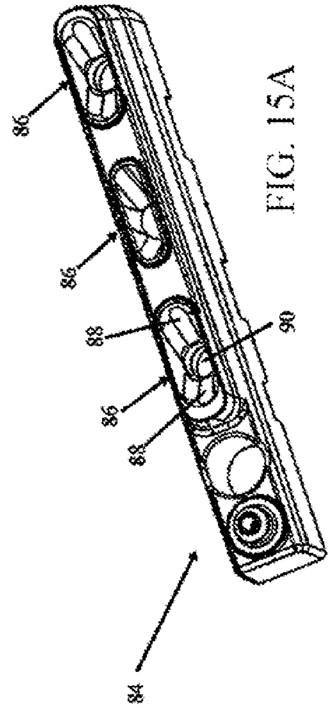
FIG. 15A is a perspective view of a shell component of the sensor assembly in FIG. 12.
Figure 15B:
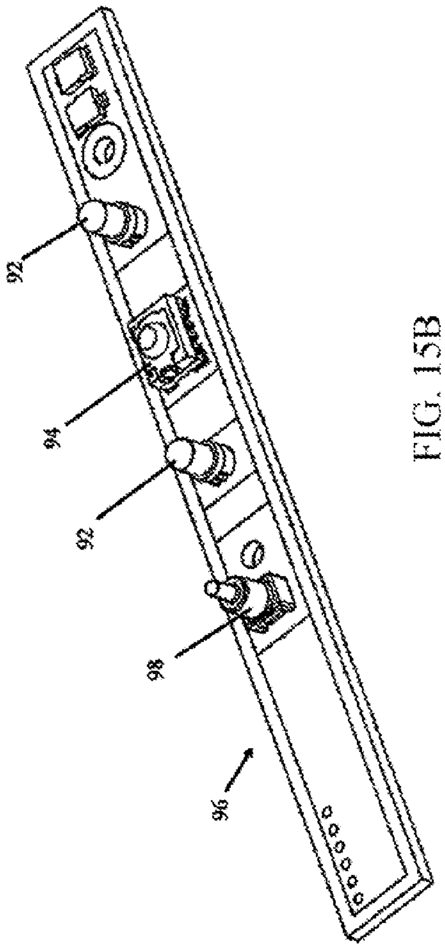
FIG. 15B is a perspective view of a plate component of the sensor assembly in FIG. 12.

With reference to FIGS. 14 and 15A-15C, the structure 82 can comprise a shell 84. The shell 84 can comprise a plurality of upper openings 86. In some embodiments, the openings 86 can be oblong-shaped. The oblong-shaped openings 86 can be formed by angled surfaces 88, the angled surfaces 88 extending towards one another in a generally V-shaped formation as they extend towards lower openings 90. The lower openings 90, along with the rest of shell 84, can be fitted over one or more light emitters 92 and one or more light receivers 94 (e.g. light detectors) of the sensor assembly 78 on a plate 96. As illustrated in FIG. 15B, the plate 96 can include one or more button and/or switches 98 for allowing a user to issue input commands to the controller 58. In some embodiments, the button and/or switch can be activated by pressing a portion or portions of the covering 80.

Figure 15C:
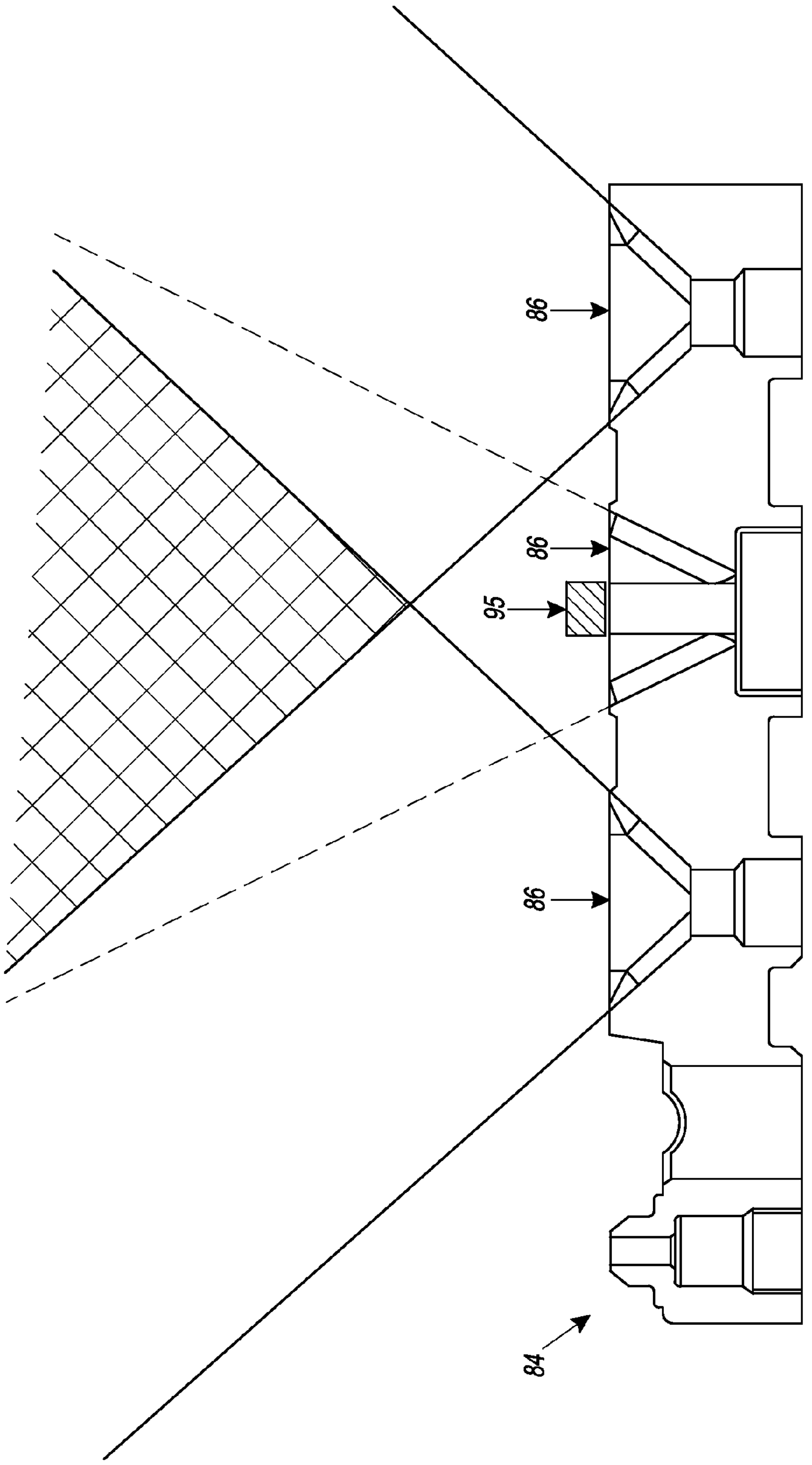
FIG. 15C is a cross sectional view of the shell component of the sensor assembly in FIG. 15A.

FIG. 15C represents a cross-sectional view of the shell 84. In some embodiments, the openings 86 over the light emitters 92 and light receiver 94 can be formed into V-shaped formation to provide a light emitting region above the sensor assembly 78 and the trash can assembly 20. The light emitting region can be generally cone-shaped projecting from about the opening 86 due to its shape. In some embodiments, the openings 86 over the light emitter 92 can have opening angles of from about 20 degrees to about 80 degrees as shown in the plane of FIG. 15C. Likewise, in some embodiments opening 86 over the light receiver 94 can have an angle of from about 20 to about 80 degrees as shown in the plane of FIG. 15C.

In some embodiments, multiple light emitting regions from light emitted from the light emitter 92 can overlap and create an overlapping region, represented with hatched lines in FIG. 15C. The overlapping region provides an amplified or stronger light emitted region to sense presence of an object or user.

With continued reference to FIG. 15C, in some embodiments the light receiver 94 detects reflected light by an object or user of the light from the light emitter 92. In some embodiments, the light receiver 94 is embedded deeper into the opening 86 of the shell 84, as compared for example to the light emitters 92 on either side, in order to reduce ambient light being flooded into the light receiver 94 and causing it to false trigger. In some embodiments, the light receiver 94 can have an attenuator 95 placed above it. The attenuator 95 over the light receiver 94 helps to prevent false triggering of the sensor assembly 78 by filtering out a flood of ambient light that is directly above the light receiver 94. In some embodiments, the attenuator 95 can be formed on the shell 84. In other embodiments, the attenuator 95 can be incorporated on to the outer covering 80 (shown in FIGS. 12 and 13) covering the sensor assembly 78 over the light receiver 84. The attenuator 95 can be incorporated on to the outer covering 80 in form of a different material, such as tape, or variation in texture and thickness of the outer covering 80. The attenuator 95 can have a width about the width of the light receiver 94, such as 1 mm to about 3 mm.

With continued reference to FIG. 15B, the light emitters 92 can be configured to emit light in the infrared range so it is generally not visible to the naked eye. Such light emitters are widely commercially available in many forms from many sources.

The light receivers 94 are similarly also widely available from many sources. In some embodiments, the light receivers 94 are configured to receive light in the infrared range. Further, the receivers themselves 94 or with a separate band pass filter, can be designed to only issue output signals in a specific range, such as 38 KHz or other frequencies.

Figure 16A:
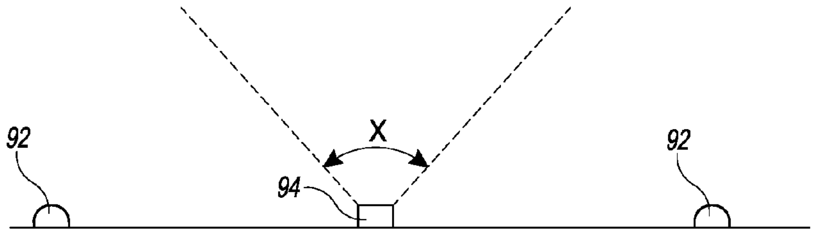
FIG. 16A is a schematic front elevational view of a sensor arrangement for the sensor assembly of FIG. 12, illustrating a viewing angle thereof.
Figure 16B:
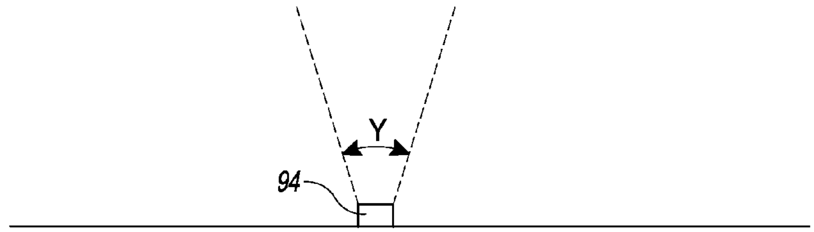
FIG. 16B is a schematic side elevational view of the sensor arrangement for the sensor assembly of FIG. 12, illustrating a viewing angle thereof.

The light receivers 94 can be configured to have an oblong receiving or viewing area, for example with the aid of shell 84 and the oblong openings 86. With reference to FIG. 16A, in some embodiments the light receivers 94 are designed to receive light over an angle X extending generally in a direction parallel to the front wall 40 of the outer shell 22. Additionally, and as seen in FIG. 16B, the light receiving devices 94 can be configured to receive light over viewing angle Y extending in a direction generally perpendicular to the front wall 40 of the shell 22. As such, the respective viewing areas of the devices 94 are generally fan shaped when the angle X is larger than the angle Y. In some embodiments, both angles X and Y are acute. In some embodiments, the angle X can be about 45 degrees. Additionally, in some embodiments, the angle Y can be less than about 45 degrees. In some embodiments, the angle Y is less than 30 degrees. Further, in some embodiments, the angle Y is 20 degrees or less. In some embodiments, the angle Y is less than the angle X. In some embodiments, the light receivers 94 can be provided with such a fan shaped viewing area by placing shell 84, with its oblong openings 86, over the light receiving devices 94. However, other techniques can also be used.

By providing a viewing angle that is wider in a direction parallel to the front wall 40 but narrower in a direction perpendicular to the front wall 40, the light receivers can be less likely to be triggered by a person or user walking parallel to the front wall 40 unless part of their body extends toward the front wall 40 so as to be disposed generally directly above the light receivers 94. In some embodiments, once the lid 24 is triggered open by the user, the lid 24 can be held in the open position by triggering of the light receivers 94 by the inner liner 32 when inserting or changing a trash bag into the inner liner 32. In this embodiment, at least a portion of the inner liner 32 is raised up over the outer shell 22 and tilted forward to the front wall 40 so as to be disposed over the light receivers 94. The trash can assembly 20 can include a holding member to hold the inner liner 32 in this position when desired. This position of the inner liner 32 will keep the lid open 24 while the user is changing the trash bag in the inner liner 24.

Figure 16C:
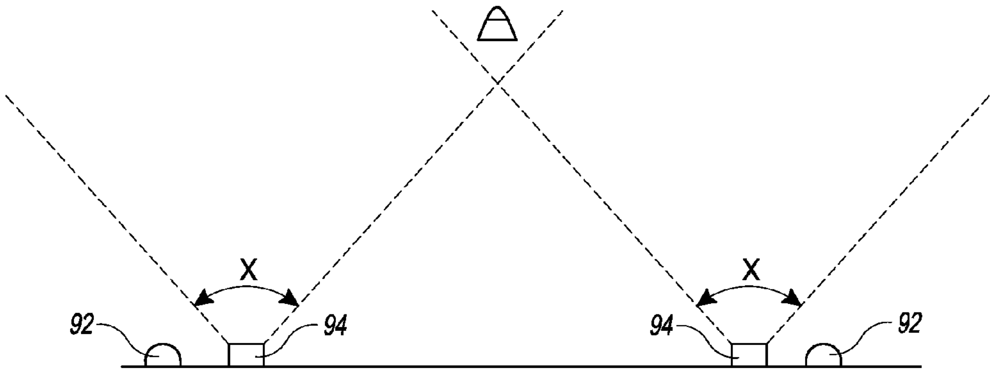
FIG. 16C is a schematic front elevational view of another embodiment of a sensor arrangement for a sensor assembly, illustrating viewing angles thereof.

Further, in some embodiments, multiple light receivers 94 can be used. For example, with reference to FIG. 16C, two light receivers 94 can be used. In such an embodiment, the respective viewing areas of the light receivers 94 can overlap in an area identified by the capital letter A in FIG. 16C. Such overlap can provide additional detection ability and does not interfere with the operation of the light receivers 94. Similarly, in some embodiments only one light emitter 92 can be used. Thus, any number of combination of light emitter(s) 92 and light receiver(s) 94 can be used with the trash can 20 described herein.

Figure 16D:
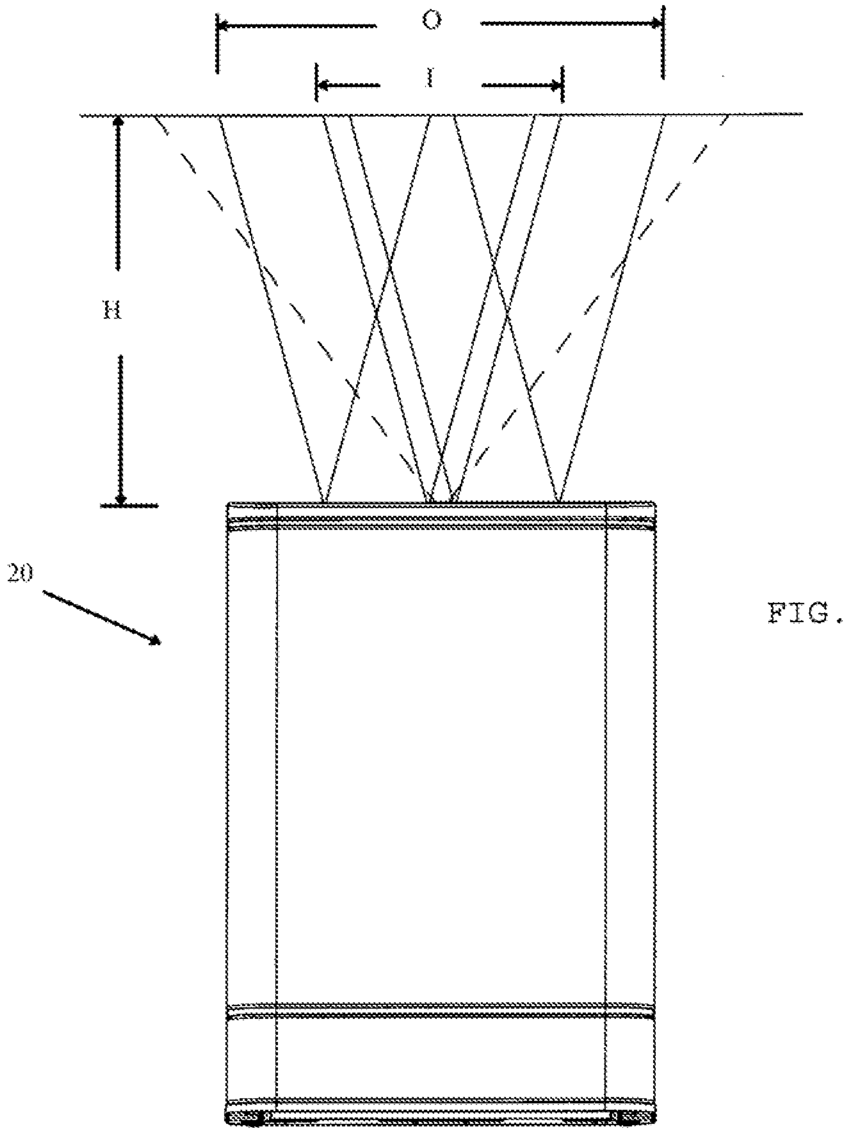
FIG. 16D is a front side elevational view of an embodiment of an enclosed receptacle having additional light emitters located in a sensor assembly.
Figure 16E:
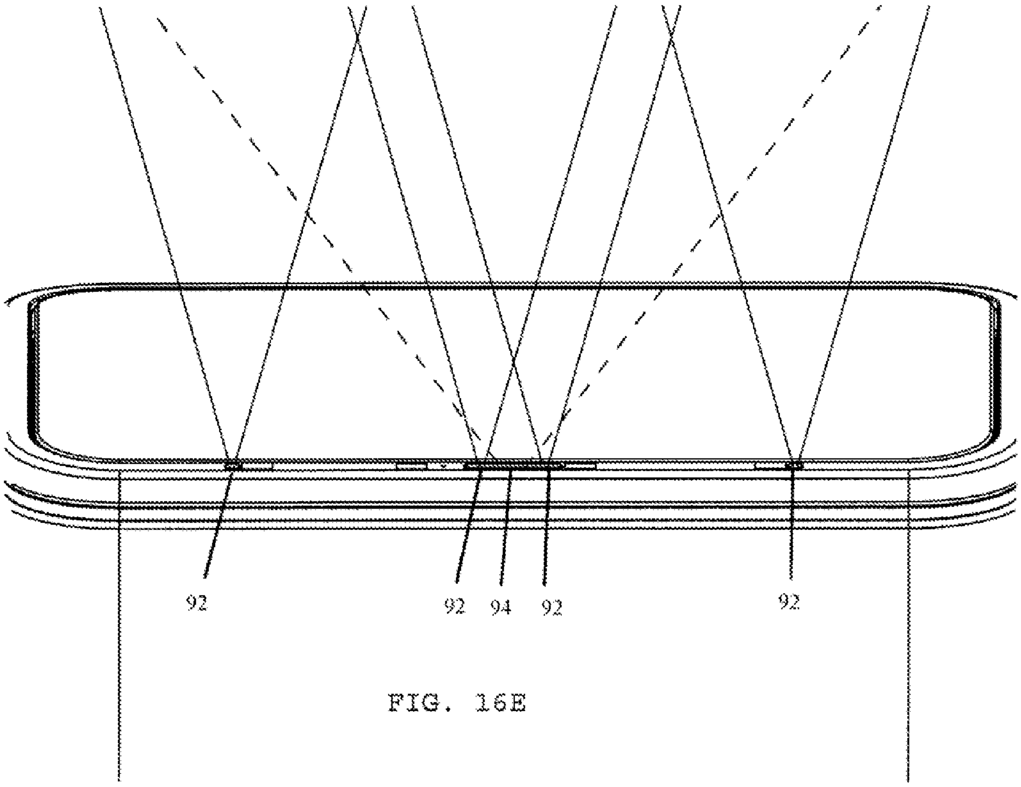
FIG. 16E is a front and top side perspective view of the enclosed receptacle of FIG. 16D.

With reference to FIGS. 16D and 16E, in some embodiments the sensor assembly 78 can have multiple light emitters 92, such as four emitters, and at least one light receiver 94. In some embodiments, all of the light emitters 92 can be operated at the same time initially. In other embodiments, only some of the light emitters 92 can be operated initially to transmit light, such as the two inner light emitters 92 emitting light over a central portion of the trash can assembly 20 (or the sensor assembly 78), designated for example as capital letter I in FIG. 16D, and the receiver 94 configured to receive light reflected. Moreover, when the two inner light emitters 92 are initially activated and activity is sensed, the sensor assembly 78 can go into a hypermode operation (described more in detail below with reference to FIG. 27.) In the hypermode operation, the two additional outer emitters 92 can then be activated to transmit light over a broader region above the sensor assembly 78 (and the trash can assembly 20), designated for example as capital letter O in FIG. 16E, to detect for activity of a user around the trash can assembly 20 in a wider range.

With continued reference to FIGS. 16D and 16E, the light emitting regions are represented by solid lines above the trash can assembly 20 and the light detecting region is represented by dashed lines. The light emitting regions can project to a width, for example as represented by capital letter O in FIG. 16D, that is about the same as the width of the trash can assembly 20. The intensity of each light emitter 92 and the light detector 94 can be controlled so that they project light to about the same height. The light emitting regions and the light detecting region can be projected to about the same height (represented by a horizontal line above the regions, and capital letter H in FIG. 16D). The height can be adjusted arbitrarily to account for the height of the user activity above the sensor assembly 78. The height H can represent a sensitivity area or zone. In some embodiments, the height H can be from about 5 to about 30 inches, such as about 15 inches.

Figure 17:
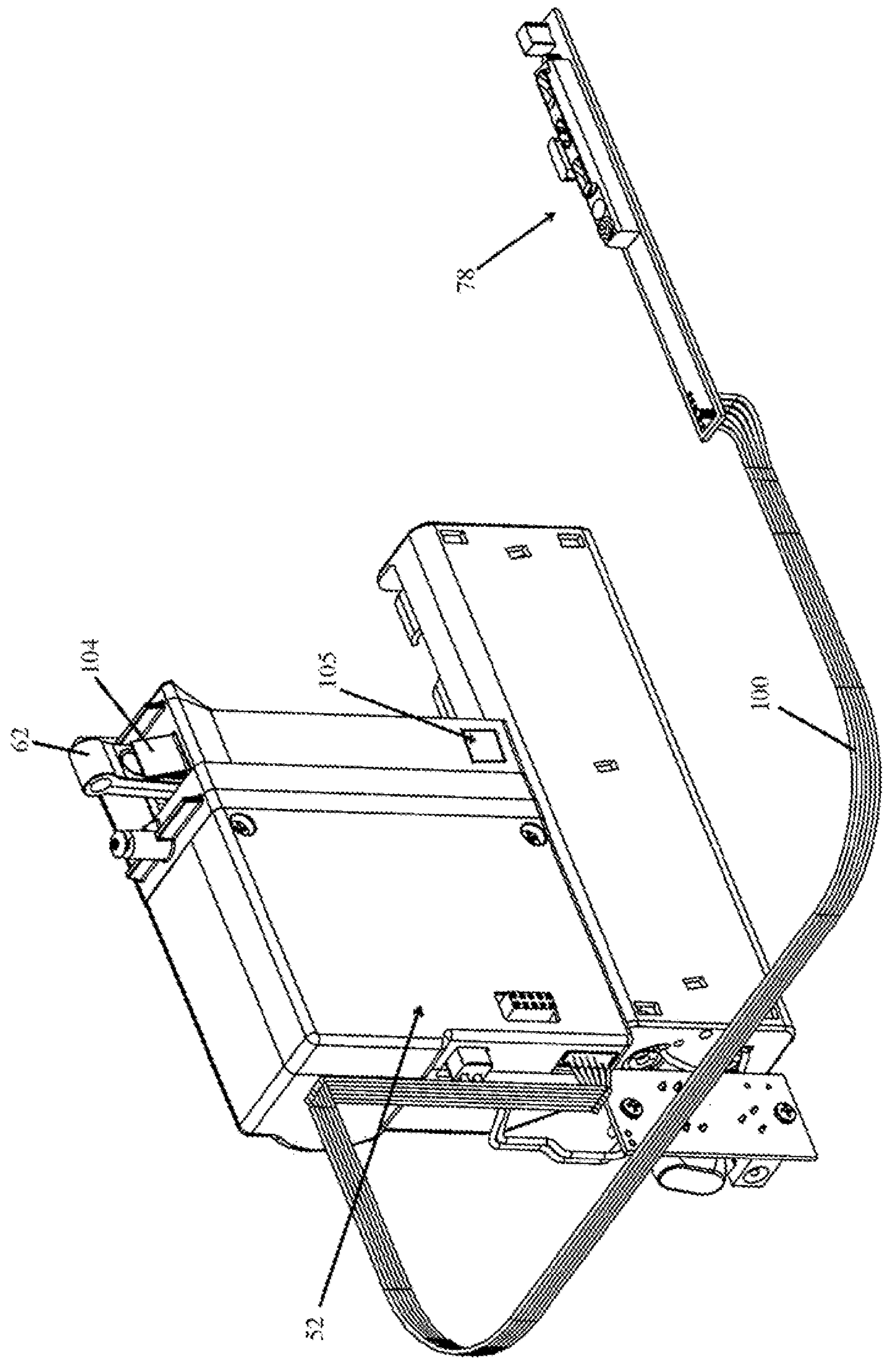
FIG. 17 is a perspective view of the lifting mechanism connected to the sensor assembly.

With reference to FIG. 17, the sensor assembly 78 can be connected to and communicate with the lifting mechanism 52 via an electrical ribbon 100 or other suitable structure. In some embodiments, the sensor assembly 78 can communicate wirelessly with the lifting mechanism 52.

Figure 18:
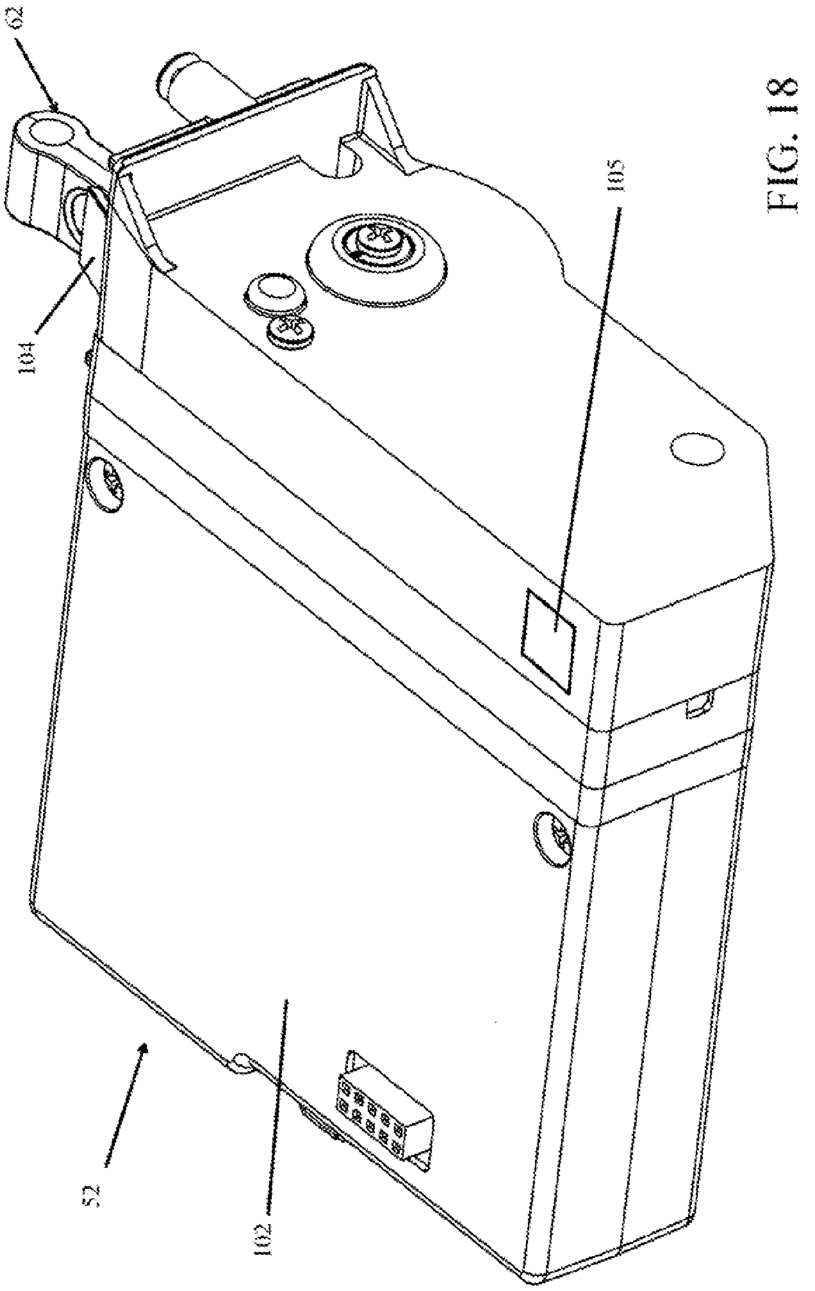
FIGS. 18 and 19 are perspective views of the lifting mechanism, further illustrating a gate member.
Figure 19:
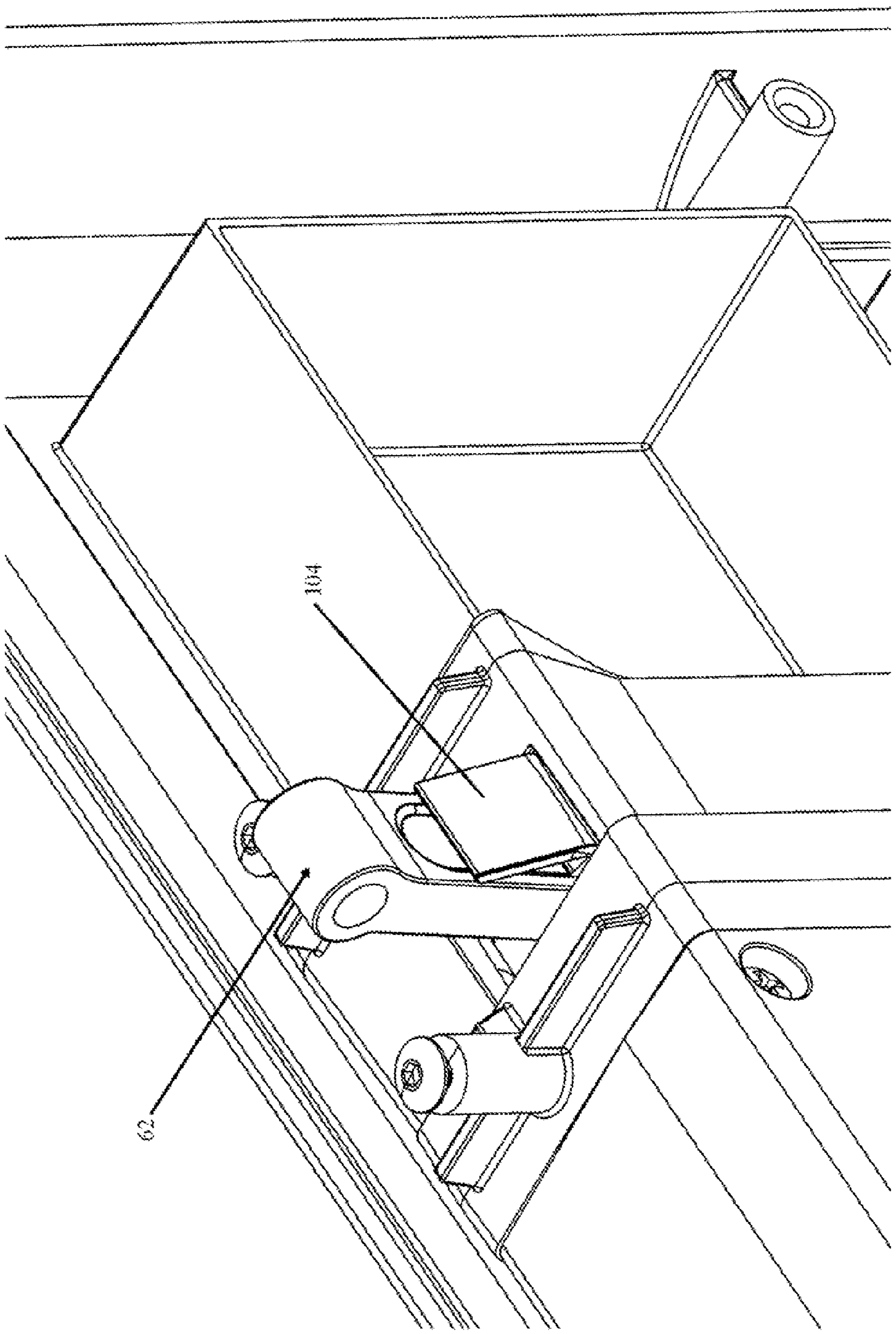

With reference to FIGS. 18 and 19, the lifting mechanism 52 can comprise an outer housing 102 and a gate member 104. As illustrated in FIG. 19, the gate member 104 can be swung open and closed to accommodate movement of the lifting mechanism 52. In particular, the gate member 104 can be used to inhibit or prevent debris and other unwanted material from entering an area or areas of the lifting mechanism 52. Further, in some embodiments the lifting mechanism 52 can comprise a hole or opening 105, as seen for example in FIG. 18. The hole or opening 105 can be used to remove debris or material that has accumulated within the lifting mechanism 52.

Figure 20:
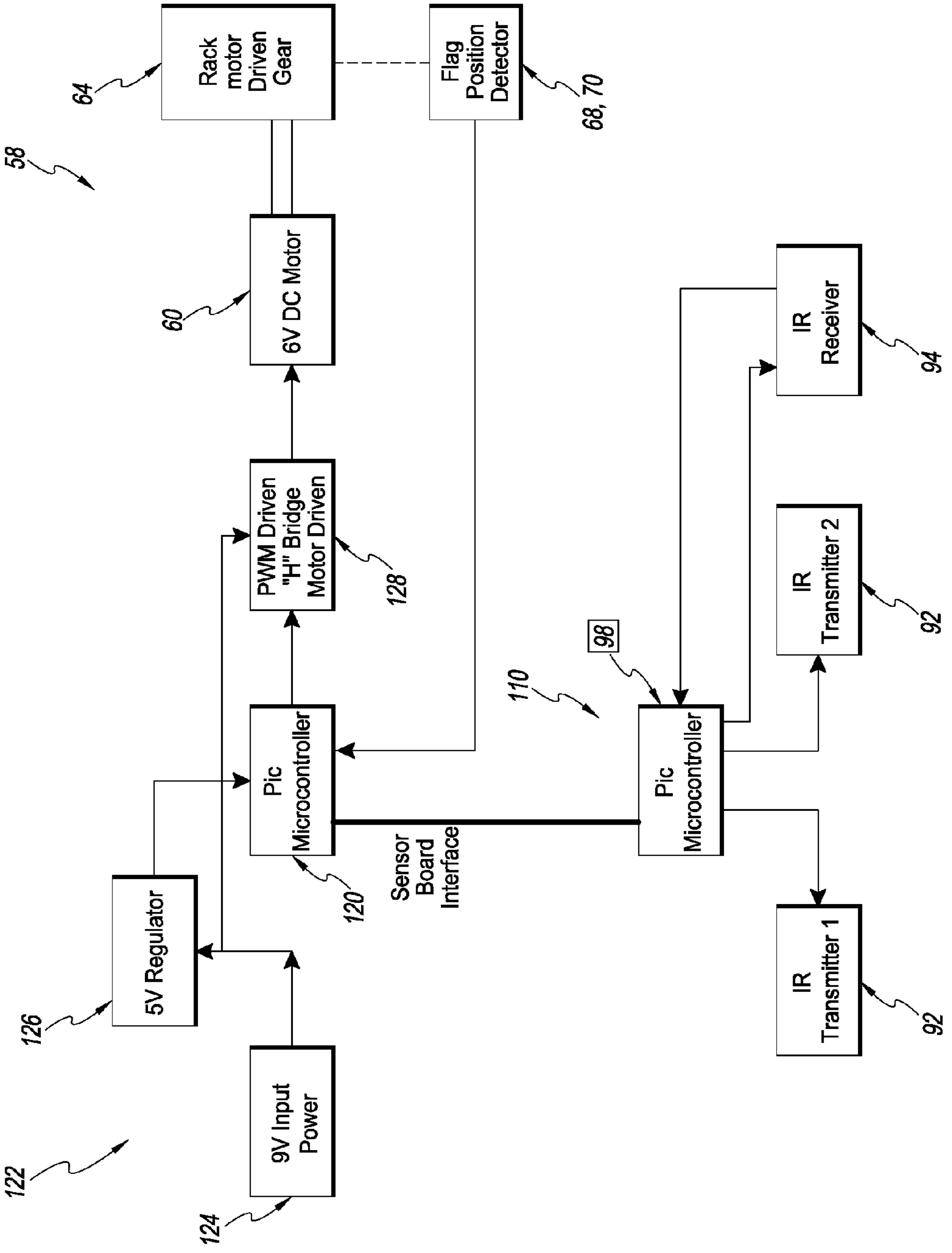
FIG. 20 is a block diagram of a controller that can be used with the trash can illustrated in FIG. 1.

With reference to FIG. 20, the controller 58 can be constructed in any known manner, including in the form of hard-wired system comprising individual electronic components such as resistors, capacitors, pulse generators, operational amplifiers, logical gates, etc. In other embodiments, the controller 58 can be comprised of commercially available processors, microprocessors, micro controllers, each including the respective appropriate operating systems and software for performing the functions and control routines described below. In the illustrated embodiment, the controller 58 includes two micro controllers.

One micro controller 110 can be configured to operate the optical transmitter and receiver system for detecting input from a user for opening the lid 24. For example, in some embodiments, the micro controller 110 can be configured to cause the light emitter(s) 92 to emit an encrypted signal of light, such as infrared light, in pulses at a frequency of 38 KHz. The patterns of emissions from the emitter(s) 92 are described in greater detail below with reference of FIGS. 22, 23.

When the micro controller 110 determines that input has been detected, it can issue a command to a second micro controller 120 to open the lid 24. The controller 58 can also include a power supply 122 configured to provide a stable output of 5 volts. For example, the power supply 122 can include a power source 124 which can be in the form of batteries or an AC to DC converter configured to output 9 volts. When the power source 124 is in the form of an array of batteries, it may output a voltage as low as 5 volts. The power supply 122 can also include a regulator 126 configured to output a stabilized voltage of 5 volts to the micro controllers 110 and 120.

The micro controller 120 can also be configured to drive a motor controller 128 which can be operatively connected to the motor 60. With continued reference to FIG. 20, the position detectors (position sensors) 68, 70 can be in communication with the second micro controller 120. The micro controller 120 can issue commands to the motor 60 and the driver gear 64.

All of the components described above with regard to the controller 58 can be mounted to a single or a plurality of circuit boards. In the illustrated embodiment, for example, the controller 58 is incorporated into a controller board 59 (see, e.g. FIG. 5).

Figure 21:
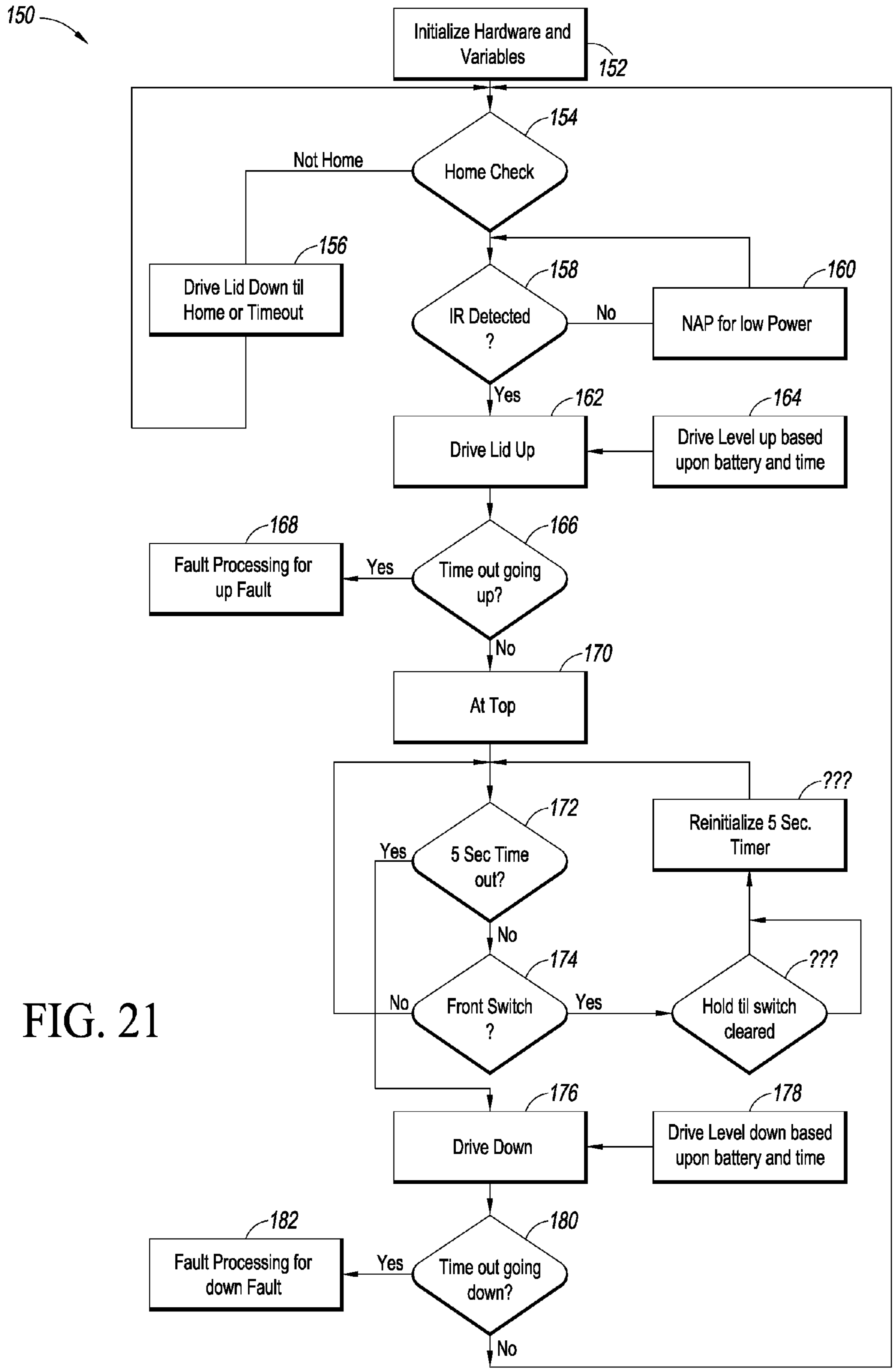
FIG. 21 is a flowchart illustrating a control routine that can be used in conjunction with the trash can of FIG. 1.

With reference to FIG. 21, a control routine 150 can be used in conjunction with a controller 58. For example, the control routine 150 can be stored in the form of software stored in the micro controller 120. In the illustrated embodiment, the control routine 150 starts at an operation block 152. In the operation block 152, the control routine initializes the hardware and resets variables, for example, to 0 or other default settings. After the operation block 152, the control routine 150 can move to decision block 154.

In the decision block 154, it can be determined if the lid 24 is in the closed position, also referred to as the "home" position. For example, the controller 120 can determine the position of the lid 24 using the flag position sensors 68, 70. For example, as shown in FIG. 11, in the fully closed position, the flag member 76 interacts with the position sensors 68 and 70. If the micro controller 120 detects such a situation, the micro controller 120 can determine that the lid 24 is closed. Thus, in the operation block 154, if it is determined that the lid 24 is not closed, the control routine 150 can move to operation block 156.

In the operation block 156, the micro controller 120 can control the motor controller 128 to thereby drive the motor 60 to drive the lid 24 toward the closed (home) position. The micro controller 120 can continue to drive the motor 60 until the lid 24 reaches the closed position or a time out fault is detected, such as that described below with reference to operation block 182. After the operation block 156, the control routine can return to decision block 154 and continue.

If, in the decision block 154, the controller 58 determines that the lid 24 is in the closed position, the control routine 150 can move on to decision block 158.

In the decision block 158, it can be determined if a signal has been received indicating that the lid 24 should be opened. The determination of whether or not such a signal has been received can be conducted in accordance with the control routines described below with reference to FIGS. 22-24. If no signals are detected, the control routine 150 can move on to operation block 160.

In the operation block 160, the micro controller 120 can enter a nap mode so as to minimize the power consumption. This nap mode can be any type of mode for reduced power operation. For example, during the nap mode operation, neither the motor driver 128 nor the flag position detectors 68, 70 need to operate or be provided with any power whatsoever.

After the operation block 160, the control routine 150 can return to decision block 158 and repeat. It if is determined, in decision block 158, that a signal is detected, the control routine 150 can move on to operation block 162.

In the operation block 162, the micro controller 120 can drive the drive controller 128 and thus the motor 60 to move the lid 24 to the open position. As noted in FIG. 16, the operation block 162 can perform the up driving motion based on certain parameters including the state of the batteries forming the power supply 124 and the desired speed at which the lid 24 should be moved toward the open position. These features are represented by block 164. Such techniques can be performed in accordance with the corresponding techniques disclosed in FIGS. 15-21 and the accompanying text in Patent Publication No. 2007/0182551, which is hereby incorporated by reference. After operation block 162, the control routine 150 can move on to decision block 166.

In the decision block 166, it can be determined whether or not a certain maximum amount of time has elapsed in order to move the lid 24 to the fully open position. For example, if it takes more than five seconds for the lid 24 to move to the fully open position, it can be determined that there is a fault in the opening movement of the lid 24. For example, a user may have left an object on top of the lid thereby preventing the lid from moving toward the open position. In some embodiments, the controller 120 can determine that the lid has not moved to the open position by analyzing the output of the position sensors 68, 60, or any other technique. If, in the decision block 166, it has been determined that the maximum time has elapsed, the control routine 150 can move to the operation block 168.

In the operation block 168, an audible and/or visible signal can be provided to the user that a fault has been detected. The controller 58 can comprise a fault detection module, such that the micro controller 120 can stop all operation of the motor 60 to prevent any damage, or for example can cause the lid 24 to return to a closed position, home position, if a fault is detected.

If, in the decision block 166, it has been determined that the lid 24 has reached the open position before the predetermined time has elapsed, the routine 150 can move on to operation block 170. The operation block 170 represents a point in the control routine 150, however, no additional operation is necessary at this time. After the operation block 170, the control routine can move on to decision block 172.

In the decision block 172, it can be determined if the lid has remained at the open position for a predetermined open time. In some embodiments, the open time is five seconds. If it is determined that the open time has not elapsed, the routine 150 can move on to decision block 172.

In the decision block 174, it can be determined whether or not a hold open switch has been activated. For example, a button and/or switch 98 (FIG. 15) can be used as a hold open switch. Thus, if the hold open switch 98 has not been activated, the control routine can return to decision block 172.

In the decision block 172, if it has been determined that the lid has remained in the open position for the predetermined open time, the routine can move on to operation block 176.

In the operation block 176, the lid 24 can be moved to the closed position. For example, the micro controller 120 can drive the drive controller 128 to drive the motor 60 so as to move the lid 24 toward the closed position. Similarly, as noted above with regard to the block 164, the drive down operation of operation block 176 can be performed in accordance with the parameters represented by block 178. These parameters can include the state of the batteries and other timing factors, such as the desired speed of the movement of the lid closing. These parameters and associated control routines are disclosed in Patent Publication No. 2007/0182551, which is hereby incorporated by reference. After the operation block 176, the routine 150 can move to decision block 180.

In decision block 180, it can be determined whether or not a predetermined amount of time has elapsed since the motor 60 has been activated to drive the lid 24 toward the closed position. In some embodiments, the predetermined closing time can be five seconds, or other predetermined amounts of time. If it is determined that the drive motor has been activated for more than the predetermined closing time, the control routine 150 can move on to operation block 182. In the operation block 182, the controller 40 can be signaled to output an audible and/or visual indicator that a fault has been detected in the closing movement of the lid. On the other hand, if it is determined that the closing time has not elapsed during the closing movement of the lid, in the decision block 180, the control routine can return to decision block 154 and repeat.

Figure 22:
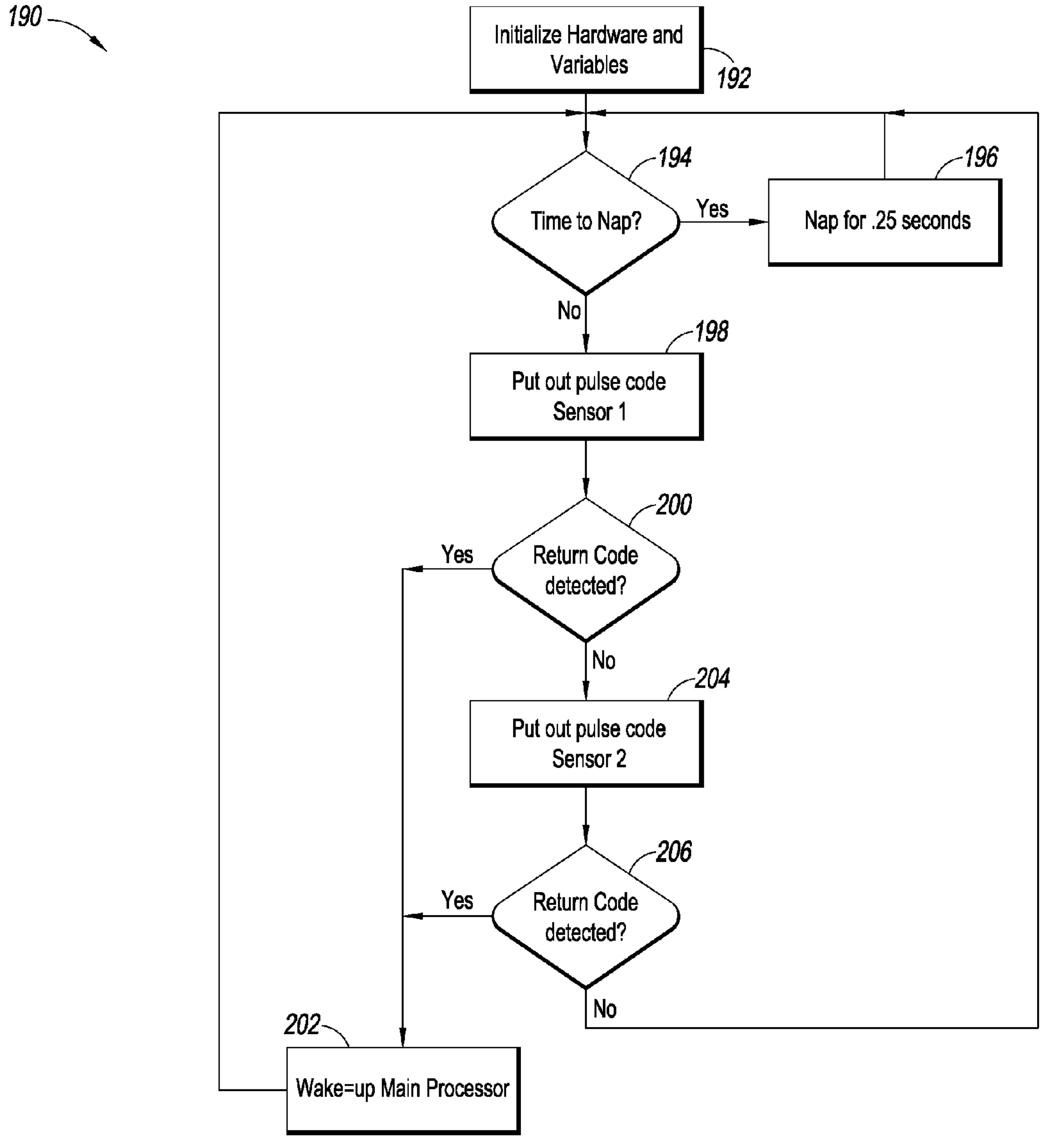
FIG. 22 is a flowchart illustrating another control routine that can be used in conjunction with the trash can of FIG. 1.

With reference to FIG. 22, the controller 58 can operate in any known manner to detect signals for opening the lid 24. FIG. 22 illustrates an example of a control routine 190 can be begin at operation block 192. In the operation block 192, similarly to the operation block 152 (FIG. 21), the control routine 190 can begin by initializing hardware and resetting variables. After operation block 192, the control routine 190 can move on to decision block 194.

In the decision block 194, it can be determined if a sleep time or (nap) timer has elapsed. If it is determined that the timer has not elapsed, the control routine 190 can move on to operation block 196.

In the operation block 196, the control routine 190 can continue to allow the system to sleep, in other words, not emit any light signals from the emitters 92 until the timer has elapsed. In some embodiments, the timer can be set to operate for 0.25 seconds. However, other predetermined amounts of time can be also be used.

After the operation block 196, the control routine can return to decision block 194 and repeat. If, on the other hand, it is determined that the sleep timer has elapsed, the control routine 190 can move on to operation block 198.

In the operation block 198, a pulsed light signal can be emitted by the light emitter(s) 92. In some embodiments, the output of the light emitter(s) 92 can be in the form of pulsed light. In some embodiments, the light can be pulsed at a frequency of 38 KHz. Further, in some embodiments, the signal from the light emitter(s) 92 can be in the form of a two, three, or four bit encoded signal, described in greater detail below with reference to FIG. 18. After the signal has been output from the light emitter(s) 92, the control routine 190 can move on to decision block 200.

In the decision block 200, it is determined whether or not the signal emitted form the light emitter(s) 92 has been received by the light receiver(s) 92. For example, in some embodiments, the controller 110 can analyze signals received by the light receiver 92 to determine if the same pulsed output signal that was transmitted by the light emitter(s) 92 has been received by the light receiver(s) 94. If it is determined that the same pulsed output transmitted by the light emitters 92 has been received by the light receiver 94, the control routine can move on to operation block 202.

In the operation block 202, the micro controller 110 can signal the micro controller 120 to wake up and begin operation to drive the lid 24. On the other hand, if it is determined that the transmitted output signal from the light emitter(s) 92 has not been received, the control routine 190 can move on to operation block 204.

In the operation block 204, another signal can be transmitted from the light emitter(s) 92. For example, the output signal can be the same output signal that was transmitted in operation block 198 or it can be a different output signal. After the operation block 204, the control routine 190 can move on to decision block 206.

In the operation block 206, it can be determined whether or not the code output from the light emitter(s) 92 has been received by the light receiver(s) 94. If it is determined that the output signal from the light emitter(s) 92 has not been received, the control routine 190 can return to decision block 194 and continue. On the other hand, if it is determined in decision block 206 that the signal transmitted from the light emitter(s) 92 in the operation block 204 has been received, the control routine 190 can move on to operation block 202 and continue as described above.

Figure 23:
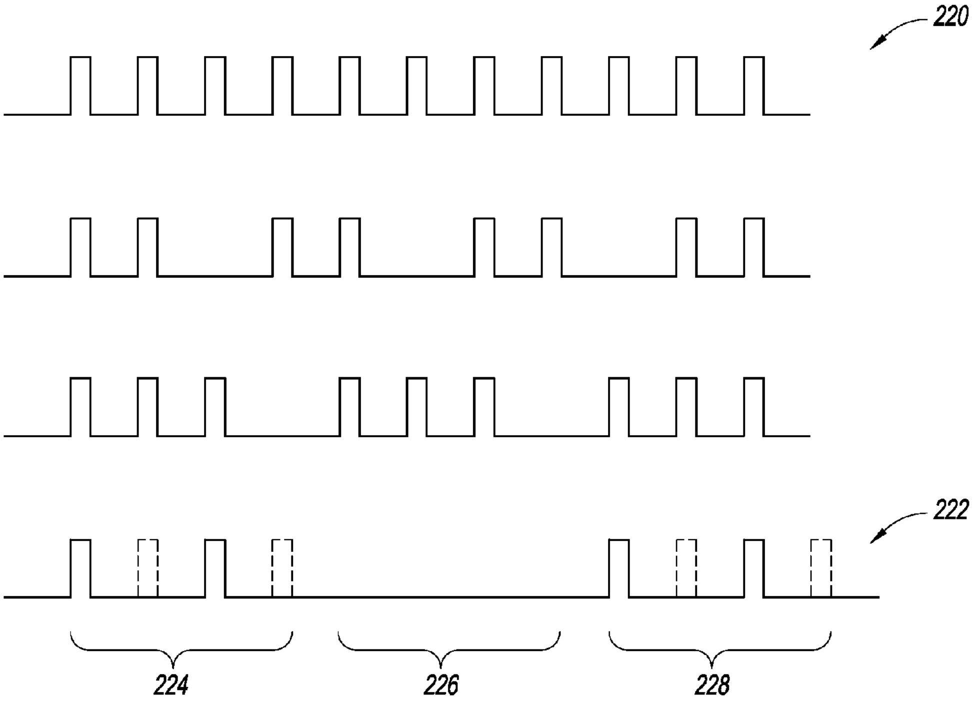
FIG. 23 is a timing diagram illustrating various optical signals that can be used in conjunction with the trash can of FIG. 1.

With regard to operation blocks 198 and 204 of FIG. 22, FIG. 23 illustrates various option encryption techniques for the signals transmitted. The signal labeled as 220 in FIG. 23 illustrates an example of a pulse signal. For example, this signal can represent a series of pulses at any frequency. For purposes of this discussion, the frequency of the pulses of the signal 220 can be at a frequency of 38 KHz.

The signal 222 illustrated in FIG. 23 represents a four bit signal issued twice with a time delay there between. In other words, the first part of the signal 224 represents a binary code signal of 1010. The solid line parts of the signal drawn represent the actual signal and the dotted line parts show missing pulses. Thus, the solid line parts of the signal illustrates when the signal goes from the baseline to the upper limit. Additionally the dashed line portions of the signal represent missing pulses. As such, the portion of the signal 224 represents as noted above, a binary code pulse: 1-0-1-0.

Additionally, the signal 222 includes a second pulsed code 228, also including a 1-0-1-0 code. Between these two portions of the signal 224, 228, there is a delay 226. In some embodiments, the delay can be 800 microseconds. However, other magnitudes of delay for the delay 226 can also be used.

It has been found that this four bit encryption technique is sufficiently scrambled that ambient sunlight or light created by a plurality of florescent tube lights will not reproduce this signal. Thus, by configuring the controller 58 to issue two (2) four-bit, spaced apart pulsed signals and to determine whether or not these two spaced apart four bit signals are reflected back to the light receiver or receivers 92, the controller can effectively prevent accidental or unintended triggering of the motor 60. Additionally, transmission and the detection of a code that is at least a four-bit encrypted code can be performed sufficiently quickly that the system responds quickly to user-input commands. However, other encryption techniques can also be used.

Figure 24:
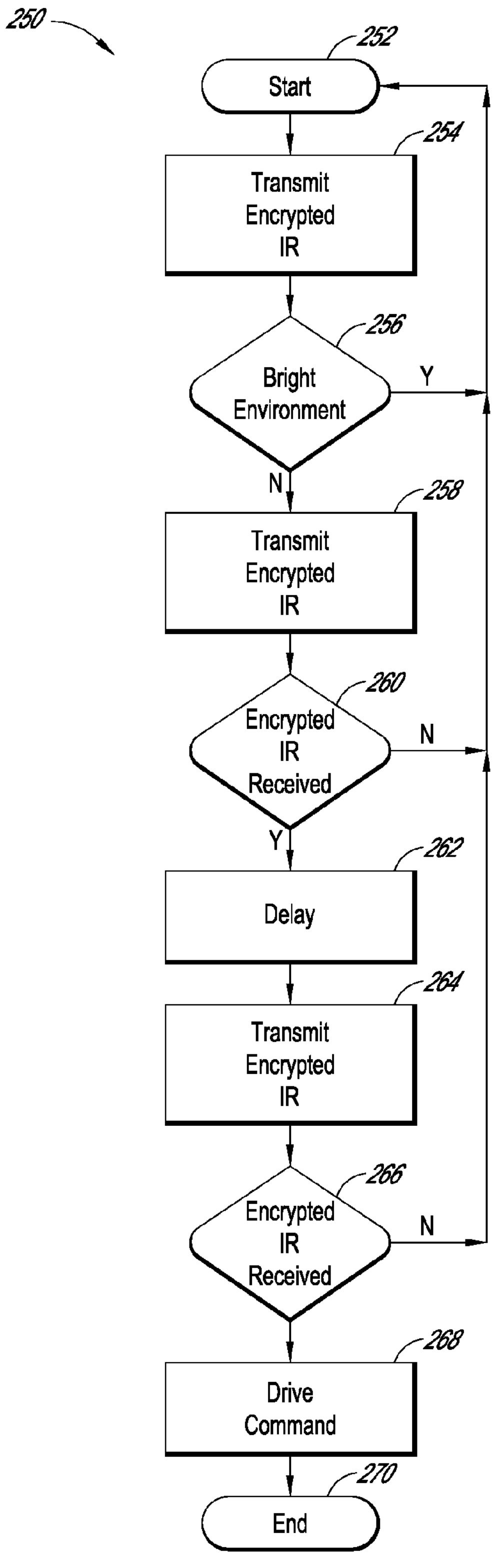
FIG. 24 is a flowchart illustrating another control routine that can be used in conjunction with the trash can of FIG. 1.

FIG. 24 illustrates yet another control routine 250 that can be used in conjunction with the controller 58. The control routine 250 can be configured to help reduce battery consumption by reducing functions performed by the micro controller 110.

For example, the control routine 250 can start at an operation block 252. In the operation block 252, hardware can be initialized and variables reset to 0 or default values. After the operation block 252, the control routine 250 can move on to operation block 254.

In the operation block 254, an encrypted signal can be transmitted from the light emitter(s) 92. After the operation block 254, the control routine 250 can move on to a decision block 256.

In the decision block 256, it can be determined whether or not the trash can 20 is being used in a bright environment, such as ambient sunlight. For example, the micro controller 110 can be configured to determine whether or not the light receiver(s) 94 are receiving light signals substantially continuously. For example, if the light receiver(s) 94 receive signals over a time period of 800 microseconds and have more than about ten to twelve dropouts during that time period, it can be assumed that the trash can 20 is being exposed to bright ambient light such as sunlight. As such, the micro controller 110 can be configured to avoid analyzing the output of the light receiver(s) 94. If it is determined, in the decision block 256, that the trash can 20 is in a bright environment, the control routine 250 can return to operation block 252 and repeat. On the other hand, if it is determined in decision block 256 that the trash can 20 is not in a bright environment, the control routine 250 can move on to operation block 258.

In the operation block 258, the micro controller 110 can operate to cause the light emitter(s) 92 to transmit an encrypted light signal, such as a signal 222 illustrated in Figured 23, or another signal. After the operation block 258, the control routine 250 can move on to decision block 260.

In the decision block 260, it can be determined whether or not the encrypted signal from operation block 258 is received by either of the light receiver(s) 94. If it is determined that the signal is not received, the control routine 250 can return to operation block 252 and repeat. On the other hand, if it is determined in decision block 260 that the encrypted signal is received, the control routine 256 can move on to operation block 262.

In the operation block 262, the control routine 250 can wait for a predetermined time period before moving on. For example, the predetermined time period can be 800 microseconds or any other delay. This delay is represented by the delay 226 in FIG. 18 in some embodiments. After the delay of operation block 262, the control routine 250 can move on to operation block 264.

In the operation block 264, a second encrypted signal is emitted from either of the light receiver(s) 94. After the operation block 264, the control routine 250 can move on to decision block 266.

In the decision block 266, it can be determined whether or not the encrypted signal transmitted in operation block 264 has received by either of the light receiver(s) 94. If the encrypted signal from the operation block 264 is not received, the control routine can return to operation block 252 and repeat. If, on the other hand, the encrypted signal from operation block 264 is received by either of the light receiver(s) 94, the control routine 250 can move onto operation block 268.

In the operation block 268, a drive command can be issued to the micro controller 120 to drive the motor 60, similar to the manner described above with reference to operation block 162 of FIG. 21, or any other technique. After the operation block 268, the control routine 250 can move on to operation block 270 and end, which can include returning to operation block 252 to repeat.

Figure 25:
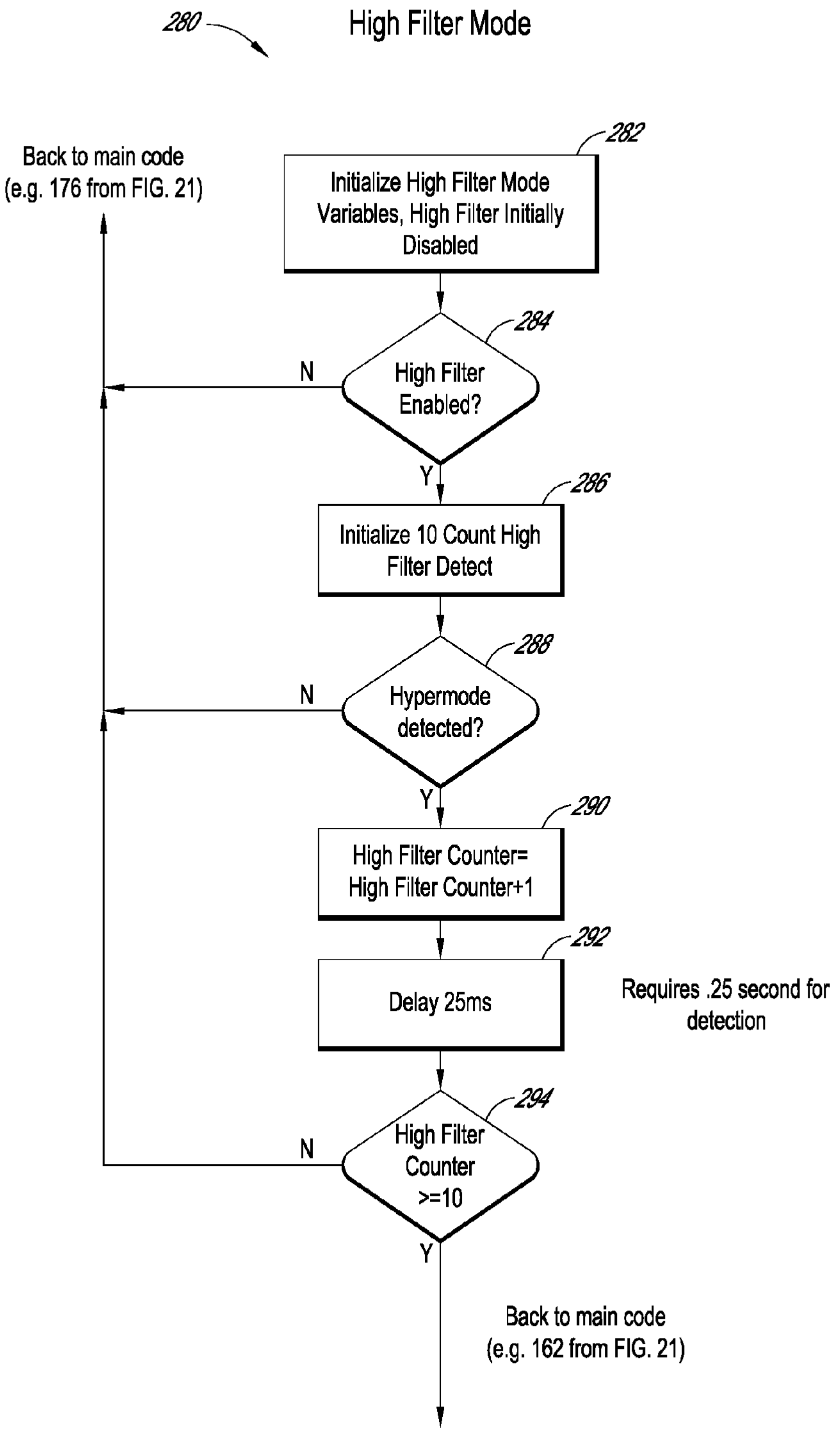
FIG. 25 is a flowchart illustrating another control routine that can be used in conjunction with the trash can of FIG. 1.

FIG. 25 illustrates yet another control routine 280 in conjunction with the controller 58. The control routine 280 can be configured to help filter out extraneous signals while the lid 24 is in the process of closing. As a lid 24 is closing, the user may not wish to have the lid be unintentionally reopened. This unintentional reopening can sometimes occur due to movement of the lid itself, and/or other sources of movement or light. Therefore, a high filter mode can be implemented during the time the lid is closing, in which the controller 58 requires more pulses than normal of the encrypted light pulse signal to be received by light receiver(s) 94 before triggering a reopening of the lid 24. For example, the controller 58 can look for 10 repeated encrypted signals, as opposed to 7.

In the operation block 282, the controller 58 can initialize high filter mode variables, and the high filtering operation described above can initially be disabled.

In decision block 284, the controller 58 can determine whether the high filter has been enabled. In some embodiments, the high filter can be enabled automatically whenever the lid 24 begins to close. For example, the high filter can be enabled during operation block 176 of control routine 150. In some embodiments, the user can be required to enable the high filter by pushing a button and/or switch 98.

In the operation block 286, the controller 58 can initialize a ten (or other number) count high filter detection.

In the decision block 288, the controller 58 can determine whether a hypermode has been detected. Hypermode, in control routine 280, can refer to whether the controller 58 has received indication that the lid is still in an un-closed position (e.g. that the position detectors 68, 70 have not identified that the lid is in a fully closed position). If the lid is still in an un-closed position, the high filter operation can commence in operation blocks 290 and 292.

In operation blocks 290 and 292, the controller can initialize a counter that begins counting the number of times the encrypted signal from light emitter(s) 92 is received by light receiver(s) 94. The controller can require, for example, 0.25 seconds for detection of ten cycles of the signal, with a delay of 0.025 seconds in between each detection of the encrypted signal. Other time intervals can also be used, as can other numbers of cycles.

In decision block 294, the controller can determine whether the ten signals have been received within the 0.25 seconds. If yes, then the lid can be reopened (e.g. operation block 162 of control routine 150 can be implemented). If no, then the lid can continue to fall towards a closed position (e.g. operation block 176 of control routine 150 can be implemented).

Figure 26:
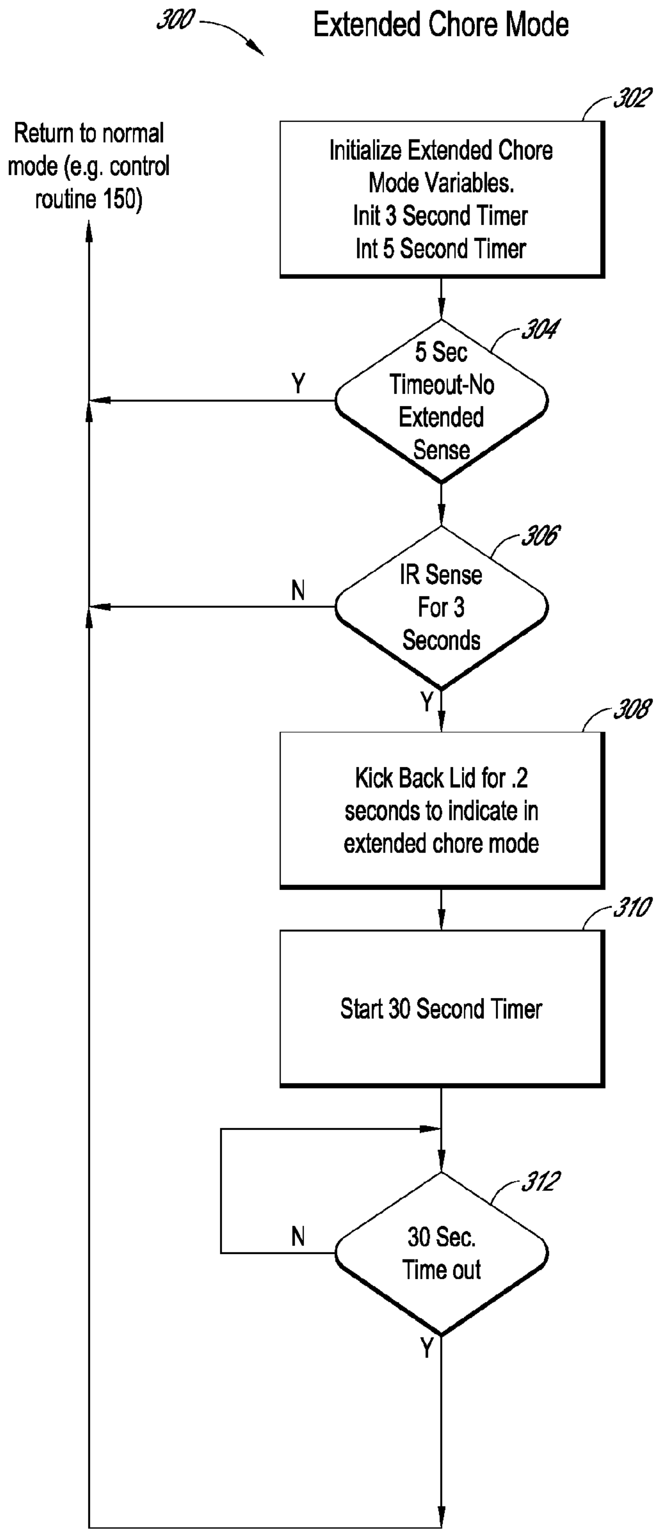
FIG. 26 is a flowchart illustrating another control routine that can be used in conjunction with the trash can of FIG. 1.

FIG. 26 illustrates yet another control routine 300 in conjunction with the controller 58. The control routine 300 can be configured to keep the lid 24 open for an extended period of time (e.g. thirty seconds) if the light receiver(s) 94 have received an encrypted light pulse signal for a specified period of time (e.g. for three straight seconds). The control routine 300 advantageously allows a user to have the lid 24 of trash can 20 remain open for extended periods of time while the user is throwing away trash, so that the user can place multiple items of trash into the trash can 20 without having to worry about the lid 24 closing in between each item.

In operation block 302, the controller 58 can initialize extended chore mode variables, and begin at least one timer. For example, the controller 58 can begin a five second timer. Other periods of time can also be used.

In decision block 304, the controller 58 can determine whether the five seconds have passed without the controller 58 having received the encrypted light pulse signal for a predetermined period of time.

In decision block 306, the controller 58 can also determine whether the light receiver(s) 94 have detected the encrypted light pulse signal for at least three straight seconds. Other periods of time can also be used. If the five second timer has not passed, and the controller 58 has determined that the light receiver(s) have received the encrypted light pulse signal for at least three seconds, then the control routine can move on to operation block 308.

In operation block 308, the controller 58 can kick back the lid 24 for two seconds to indicate that the trash can 20 is in an extended chore-type mode.

In operation block 310, the controller 58 can then begin a thirty second timer. During the thirty seconds, the user can begin placing items of trash into the trash can 20 without having to worry about the lid 24 closing.

In decision block 312, the controller 58 can determine whether the thirty second timer has elapsed. Once the thirty second timer has elapsed, the trash can 20 can return to normal mode. For example, the control routine can return back to control routine 150 shown in FIG. 21, and more specifically, for example, to operation block 176 of control routine 150, wherein the lid 24 is closed.

Figure 27:
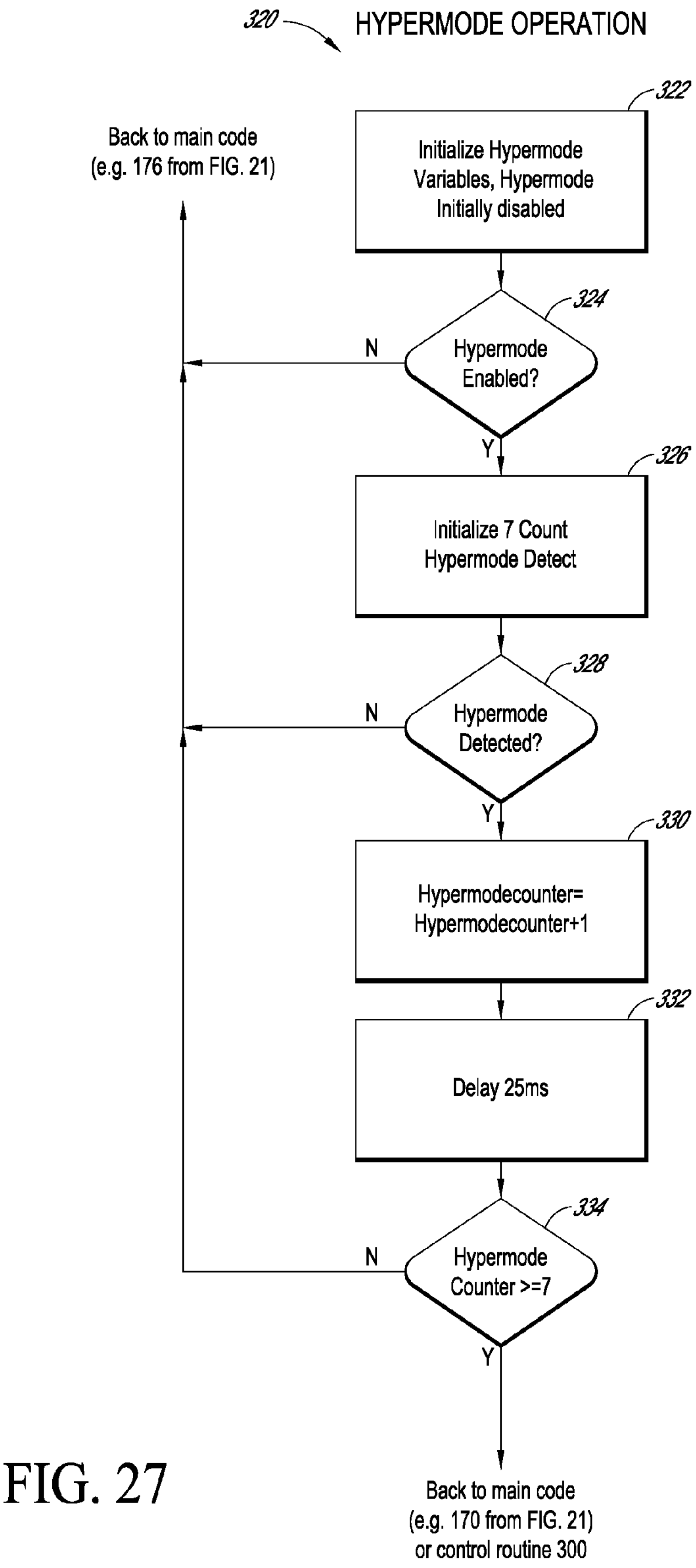
FIG. 27 is a flowchart illustrating another control routine that can be used in conjunction with the trash can of FIG. 1.

FIG. 27 illustrates yet another control routine 320 in conjunction with the controller 58. The control routine 320 can be configured to implement a hypermode operation of the trash can 20. The hypermode operation of the trash can 20 can be used, for example, to increase detection of the encrypted light pulse signal from light emitter(s) 92 while the lid is in an open state (e.g. while it is completely open, or not yet fully closed). The increased detection can occur because of increased amperage of the encrypted light pulse signal (i.e. thus making it more easily detected by the light receiver(s), and/or an increase in the frequency of the encrypted light pulse signal. In a preferred arrangement, the hypermode operation can be used while the lid 24 is completely open, so that if the user suddenly decides to keep the lid open, and places his or her hand over the light emitter(s), the trash can 20 will more quickly recognize the command.

In operation block 322, the controller 58 can initialize hypermode variables, and initially disable the hypermode operation.

In decision block 324, the controller 58 can determine whether the hypermode operation has been enabled. In some embodiments, the hypermode operation can automatically be enabled every time the lid 24 reaches a fully open position (e.g. as detected by the position detectors 68, 70). In some embodiments, the hypermode operation can be implemented manually by using one of the buttons and/or switches 98 described above. If the hypermode operation is enabled, the control routine 320 can move on to operation block 326.

In operation block 326, the controller 58 can initialize the hypermode, in which the controller 58 begins to increase the amperage of the encrypted light pulse signal (e.g. increasing the amperage to three times its normal level), and/or increase the frequency of the encrypted signal (e.g. increasing it to greater than 38 KHz). Other values and ranges are also possible. In some embodiments, this can increase the detection range of the encrypted light pulse signal. For example, in some embodiments the range of the light receiver(s) 94 can be increased to 14 to 18 inches of the trash can, as opposed for example to a shorter range when the trash can 20 is not in hypermode.

In decision block 328, the controller 58 can determine whether the hypermode is working correctly, and/or whether the light receiver(s) 94 is beginning to receive the encrypted light pulse signals. If the light receiver(s) 94 is beginning to receive the encrypted light pulse signal, the control routine can move on to operation blocks 330 and 332.

In operation block 330, the controller 58 can initialize a hypermode counter, which can be used to count the number of cycles of the encrypted light pulse signals that are received the light receiver(s) 94.

In operation block 332, the controller 58 can delay 0.025 seconds. Other time periods are also possible.

In decision block 334, the controller 58 can determine whether the hypermode counter has counted at least seven detected cycles of the encrypted light pulse signal. If at least seven cycles have been detected, the control routine 320 can move back to the main code, and specifically for example to operation block 170 from FIG. 21, or to control routine 300 described above and illustrated in FIG. 26, where the lid is in an open state.

If there is no detection, then the control routine 320 can move back to the main code, and specifically for example to operation block 176 from FIG. 21, where the lid 24 can begin to close.

Figures 1, 28:
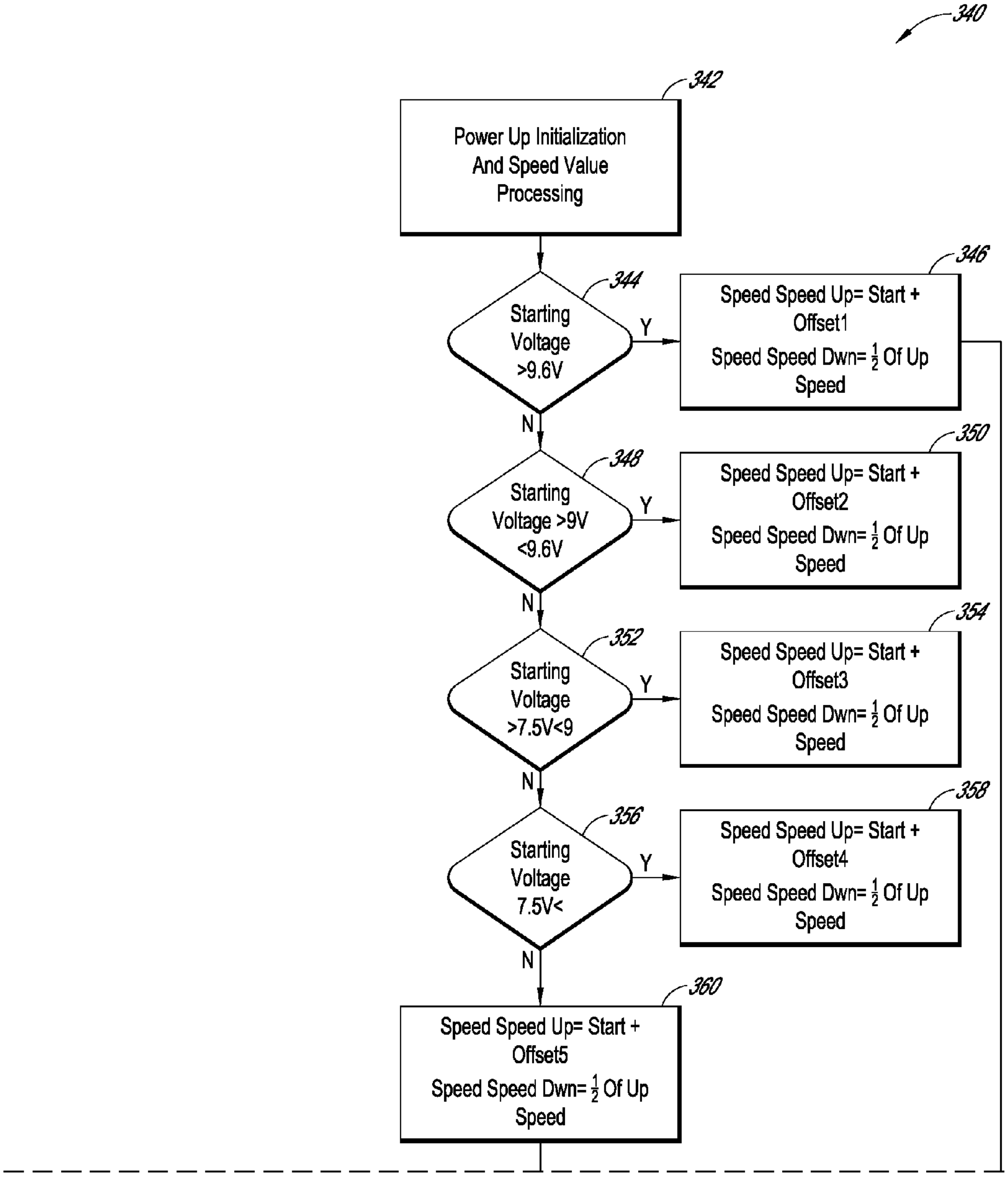
FIG. 28 is a flowchart illustrating another control routine that can be used in conjunction with the trash can of FIG. 1.
Figures 2, 28:
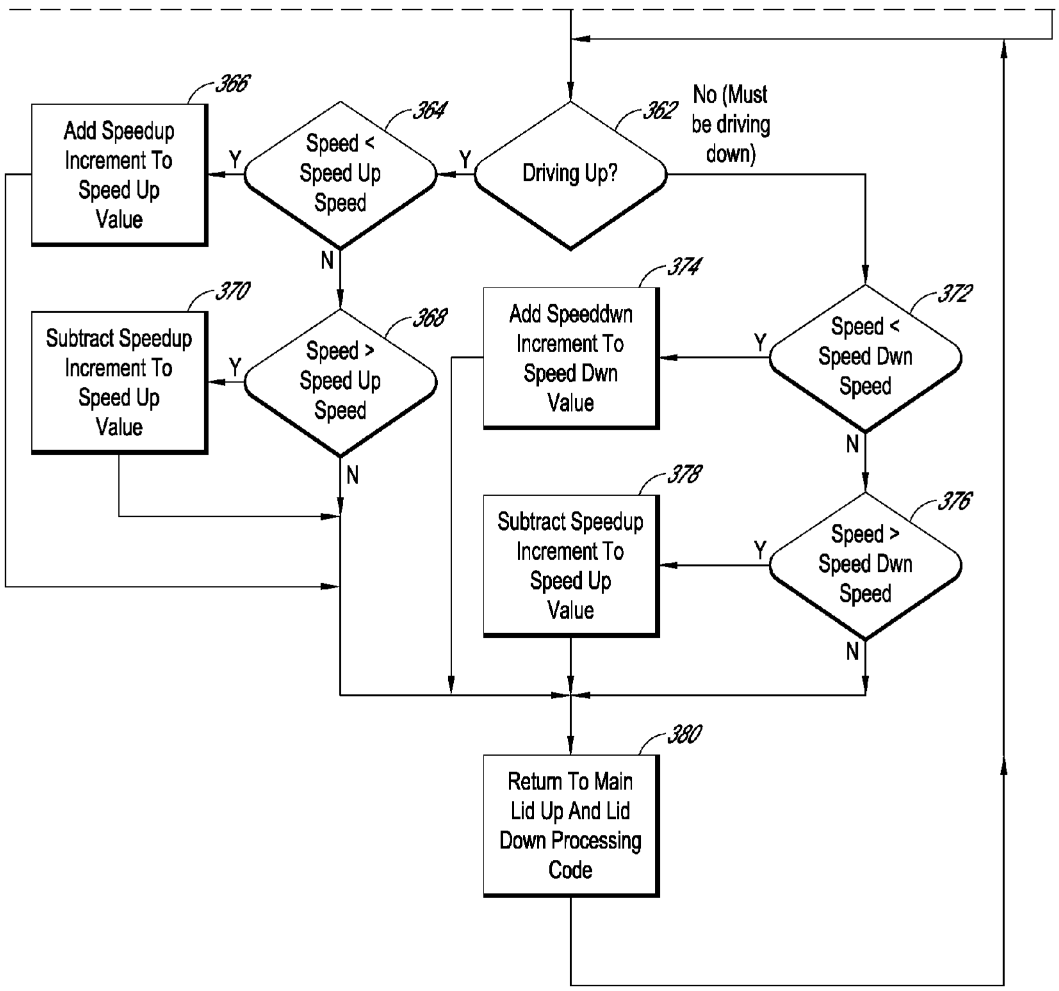

FIG. 28 illustrates yet another control routine 340 in conjunction with the controller 58. The control routine 340 can be used to adjust the speed of the lid 24 as it moves from a closed state to an open state, and/or from an open state to a closed state. Speed adjustments can be made, for example, by monitoring one or more speed sensors or position detectors (e.g. position detectors 68, 70), and adjusting the amount of voltage applied by the batteries to the motor 60. The speed of the lid 24 can be adjusted so that the lid 24 maintains a generally constant and/or repeatable speed each time the trash can 20 is used. The speed adjustments can be based on predetermined, optimal speeds for the lid 24. Therefore, if the lid 24 is operating outside of the optimal speed, the lid speed can be adjusted to bring the speed of the lid 24 back to its optimal speed. Further, to prevent near constant adjustment of the speed of the lid 24 (and battery wear), in some embodiments the speed of the lid 24 can be adjusted only if the recognized actual speed is a predetermined distance away from the optimal speed.

In operation block 342, the controller 58 can initialize a speed value processing mode. For example, the controller 58 can detect a position of the lid 24 based on the position detectors 68, 70, and calculate how fast the lid 24 is moving based on data received from the position detectors 68, 70.

In decision block 344, the controller 58 can determine whether a starting voltage is greater than 0.6 Volts. The starting voltage can be the voltage of a battery powering the motor 60. The starting voltage can be representative of the current speed of the If yes, then in operation block 346 a first speed offset can be associated to the current speed, to bring the current speed up or down to the optimal speed.

In decision block 348, the controller 58 can determine whether a starting voltage is greater than 9 Volts, and less than 9.6 Volts.

If yes, then in operation block 350 a second offset can be associated to the current speed, to bring the current speed up or down to the optimal speed.

In decision block 352, the controller 58 can determine whether a starting voltage is greater than 7.5 Volts, and less than 9 Volts.

If yes, then in operation block 354 a third offset can be associated to the current speed, to bring the current speed up or down to the optimal speed.

In decision block 356, the controller 58 can determine whether a starting voltage is less than 7.5 Volts.

If yes, then in operation block 358 a fourth offset can be associated to the current speed, to bring the current speed up or down to the optimal speed.

In operation block, if the answer in decision blocks 344, 348, 352, and 356 was no each time, then the controller 58 can associate a fifth offset to the current speed, to bring the current speed up or down to the optimal speed.

In decision block 362, the controller 58 can determine whether the lid 24 is being lifted towards an open position, or whether it is being driven towards a closed position. If the lid is being lifted towards an open position, the control routine 340 can move on to decision block 364.

In decision block 364, the controller 58 can determine whether the current speed of the lid 24 is less than the optimal speed for opening the lid 24 (e.g. if the speed is at least a predetermined value away from the optimal speed, or outside of a predetermined range containing the optimal speed). If the speed is less than the optimal speed, then the control routine can move on to operation block 366.

In operation block 366, the controller 58 can adjust the speed by adding one of the speed offsets described above.

In decision block 368, the controller 58 can determine whether the current speed of the lid 24 is greater than the optimal speed for opening the lid 24 (again, e.g. if the speed is at least a predetermined value away from the optimal speed, or outside of a predetermined range). If the speed is greater than the optimal speed, then the control routine can move on to operation block 370.

In operation block 370, the controller 58 can adjust the speed for example by subtracting one of the speed offsets described above.

In decision block 372, if the lid is being driven down (based on decision block 362), the controller 58 can determine whether the current speed is less than the optimal speed for closing the lid 24 (again, e.g. if the speed is at least a predetermined value away from the optimal speed, or outside of a predetermined range). If the current speed is less than the optimal speed for closing the lid 24, the control routine 340 can move on to operation block 374.

In operation block 374, the controller 58 can adjust the speed for example by adding one of the speed offsets described above.

In decision block 376, if the controller 58 can determine whether the current speed is greater than the optimal speed for closing the lid 24 (again, e.g. if the speed is at least a predetermined value away from the optimal speed, or outside of a predetermined range). If the current speed is greater than the optimal speed for closing the lid 24, the control routine can move on to operation block 378.

In operation block 378, the controller 58 can adjust the speed for example by subtracting one of the speed offsets described above.

In operation block 380, once the speed adjustments have been made, the controller 58 can return to the main code, for example to operation blocks 162 or 176 in FIG. 21, so as to move the lid 24 to an open or closed position. The control routine 340 can then continue to monitor the movement of the lid 24, and make adjustments as needed.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An enclosed receptacle comprising:

a receptacle portion defining a reservoir;

a lid mounted relative to the receptacle and configured to move between opened and closed positions;

a power supply;

a flagging member configured to indicate a position of the lid;

an assembly configured to move the lid between the opened and closed positions, the assembly comprising a lifting mechanism comprising:

a drive motor comprising a drive mechanism;

a lifting member configured to be driven by the drive mechanism; and a plurality of position detectors configured to detect a position of the flagging member;

a controller configured to receive signals from the position detectors to permit the lid to return to a home position, either by the drive mechanism or under manual force, without resetting, wherein the plurality of position detectors comprise an upper position detector and a lower position detector, and wherein when the lid is in the closed position, the flagging member is configured to trigger the lower position detector or both the lower position detector and upper position detector.

2. The enclosed receptacle of claim 1, further comprising a controller configured to control operation of the lid, the controller comprising at least one lid movement trigger module configured to detect whether a signal has been received a predetermined number of times and to issue a command to the controller to open the lid using the assembly.

3. The enclosed receptacle of claim 2, further comprising at least one light emitter and at least one light receiver mounted on the receptacle, the lid movement trigger module configured to detect whether the at least one light receiver has received a light signal.

4. The enclosed receptacle of claim 3, wherein the light signal is a four-bit signal.

5. The enclosed receptacle of claim 1, wherein the lifting member and/or drive mechanism is configured to permit slippage, such that the lid can be manually closed at any time during operation of the enclosed receptacle.

6. The enclosed receptacle of claim 1, wherein the position detectors are paired optical proximity detectors.

7. The enclosed receptacle of claim 1, wherein when the lifting member is in a fully extended position, corresponding to the lid being in the opened position, the flagging member has traveled through and above the upper position detector and the lower position detector.

8. The enclosed receptacle of claim 1, wherein when the lid is in an intermediate position between the opened position and the closed position, the flagging member is configured to interact and trigger the upper position detector.

9. The enclosed receptacle of claim 1, wherein at least a portion of the lifting mechanism is removable from the enclosed receptacle, such that it can be repaired or replaced.

10. The enclosed receptacle of claim 1, wherein the drive motor is configured to permit the lid to be returned to the closed position or the opened position by pushing manually on the lid.

11. The enclosed receptacle of claim 10, wherein the drive motor comprises a clutch configured to slip more easily when forcing the lid in a first direction than forcing the lid in a second direction.

12. The enclosed receptacle of claim 1, wherein the lifting member comprises a fork mechanism on an upper end of the lifting member, the fork mechanism configured to lift two lids.

13. The enclosed receptacle of claim 1, wherein the power supply, the assembly, and the controller are enclosed in a housing.

14. The enclosed receptacle of claim 13, wherein the housing is removable from the receptacle.

15. The enclosed receptacle of claim 13, wherein the housing is positioned on a wall of the receptacle portion.

16. An enclosed receptacle comprising:

a receptacle portion defining a reservoir;

a lid mounted relative to the receptacle and configured to move between opened and closed positions;

a power supply;

a flagging member configured to indicate a position of the lid;

an assembly configured to move the lid between the opened and closed positions, the assembly comprising a lifting mechanism comprising:

a drive motor comprising a drive mechanism;

a lifting member configured to be driven by the drive mechanism; and a plurality of position detectors configured to detect a position of the flagging member;

a controller configured to receive signals from the position detectors to permit the lid to return to a home position, either by the drive mechanism or under manual force, without resetting, wherein the drive motor is configured to permit the lid to be returned to the closed position or the opened position by pushing manually on the lid, and wherein the drive motor comprises a clutch configured to slip more easily when forcing the lid in a first direction than forcing the lid in a second direction.

17. The enclosed receptacle of claim 16, further comprising a controller configured to control operation of the lid, the controller comprising at least one lid movement trigger module configured to detect whether a signal has been received a predetermined number of times and to issue a command to the controller to open the lid using the assembly.

18. The enclosed receptacle of claim 17, further comprising at least one light emitter and at least one light receiver mounted on the receptacle, the lid movement trigger module configured to detect whether the at least one light receiver has received a light signal.

19. The enclosed receptacle of claim 18, wherein the receptacle portion comprises a support ring that is substantially flush with the receptacle portion, the lid pivotally mounted to the support ring, and wherein the at least one light emitter and the at least one light receiver are positioned within the support ring.

20. The enclosed receptacle of claim 16, the assembly further comprises a gate member configured to open and close about the lifting member.

21. The enclosed receptacle of claim 16, further comprising at least one opening in the assembly for removal of extraneous debris.

22. The enclosed receptacle of claim 16, wherein the motor includes a gear reduction of at least 5 to 1.

23. The enclosed receptacle of claim 16, wherein the lifting mechanism further comprises a guide roller configured to guide the movement of the lifting member.

24. The enclosed receptacle of claim 16, wherein the lifting member and/or drive mechanism is configured to permit slippage, such that the lid can be manually closed at any time during operation of the enclosed receptacle.

25. The enclosed receptacle of claim 16, wherein the lifting member includes a cylindrical passage at an upper end of the lifting member.

26. The enclosed receptacle of claim 25, wherein the lid includes a pin assembly, the lid configured to be connected to the lifting member with the pin assembly and cylindrical passage.

27. The enclosed receptacle of claim 16, wherein the position detectors are paired optical proximity detectors.

28. The enclosed receptacle of claim 16, wherein the plurality of position detectors comprise an upper position detector and a lower position detector.

29. The enclosed receptacle of claim 28, wherein when the lifting member is in a fully extended position, corresponding to the lid being in the opened position, the flagging member has traveled through and above the upper position detector and the lower position detector.

30. The enclosed receptacle of claim 28, wherein when the lid is in an intermediate position between the opened position and the closed position, the flagging member is configured to interact and trigger the upper position detector.

31. The enclosed receptacle of claim 16, wherein at least a portion of the lifting mechanism is removable from the enclosed receptacle, such that it can be repaired or replaced.

32. The enclosed receptacle of claim 16, wherein the first direction is down towards the closed position and the second direction is up towards the opened position.

33. The enclosed receptacle of claim 16, wherein the lifting member comprises a fork mechanism on an upper end of the lifting member, the fork mechanism configured to lift two lids.

34. The enclosed receptacle of claim 16, wherein the power supply, the assembly, and the controller are enclosed in a housing.

35. The enclosed receptacle of claim 34, wherein the housing is positioned on a wall of the receptacle portion.

36. The enclosed receptacle of claim 34, wherein the housing is removable from the receptacle.

37. An enclosed receptacle comprising:

a receptacle portion defining a reservoir;

a lid mounted relative to the receptacle and configured to move between opened and closed positions;

a power supply;

a flagging member configured to indicate a position of the lid;

an assembly configured to move the lid between the opened and closed positions, the assembly comprising a lifting mechanism comprising:

a drive motor comprising a drive mechanism;

a lifting member configured to be driven by the drive mechanism; and a plurality of position detectors configured to detect a position of the flagging member;

a controller configured to receive signals from the position detectors to permit the lid to return to a home position, either by the drive mechanism or under manual force, without resetting, wherein the power supply, the assembly, and the controller are enclosed in a housing, and wherein the housing is removable from the receptacle.

38. The enclosed receptacle of claim 37, wherein the housing is positioned on a wall of the receptacle portion.

39. The enclosed receptacle of claim 37, further comprising a controller configured to control operation of the lid, the controller comprising at least one lid movement trigger module configured to detect whether a signal has been received a predetermined number of times and to issue a command to the controller to open the lid using the assembly.

40. The enclosed receptacle of claim 39, further comprising at least one light emitter and at least one light receiver mounted on the receptacle, the lid movement trigger module configured to detect whether the at least one light receiver has received a light signal.

41. The enclosed receptacle of claim 40, wherein the receptacle portion comprises a support ring that is substantially flush with the receptacle portion, the lid pivotally mounted to the support ring, and wherein the at least one light emitter and the at least one light receiver are positioned within the support ring.

42. The enclosed receptacle of claim 37, wherein the lifting member and/or drive mechanism is configured to permit slippage, such that the lid can be manually closed at any time during operation of the enclosed receptacle.

43. The enclosed receptacle of claim 37, wherein the plurality of position detectors comprise an upper position detector and a lower position detector.

44. The enclosed receptacle of claim 43, wherein when the lifting member is in a fully extended position, corresponding to the lid being in the opened position, the flagging member has traveled through and above the upper position detector and the lower position detector.

45. The enclosed receptacle of claim 43, wherein when the lid is in an intermediate position between the opened position and the closed position, the flagging member is configured to interact and trigger the upper position detector.

46. The enclosed receptacle of claim 37, wherein the drive motor comprises a clutch configured to slip more easily when manually forcing the lid down towards the closed position than manually forcing the lid up towards the opened position.

47. The enclosed receptacle of claim 37, wherein the lifting member comprises a fork mechanism on an upper end of the lifting member, the fork mechanism configured to lift two lids.

48. The receptacle of claim 37, wherein the receptacle comprises an opening and the housing is placed in the opening such that the housing is at least partially placed in the interior of the receptacle.

* * * * *